(12) United States Patent
Kawamura et al.

(10) Patent No.: US 10,466,490 B2
(45) Date of Patent: Nov. 5, 2019

(54) VIDEO PROJECTION DEVICE AND HEAD MOUNTED DISPLAY USING THE SAME

(71) Applicant: Hitachi-LG Data Storage, Inc., Tokyo (JP)

(72) Inventors: Tomoto Kawamura, Tokyo (JP); Toshiteru Nakamura, Tokyo (JP); Yoshiho Seo, Tokyo (JP); Satoshi Ouchi, Tokyo (JP); Hidenao Saito, Tokyo (JP); Yoshio Okamoto, Tokyo (JP); Kenji Kiya, Tokyo (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 308 days.

(21) Appl. No.: 14/817,652

(22) Filed: Aug. 4, 2015

(65) Prior Publication Data

US 2016/0041396 A1    Feb. 11, 2016

(30) Foreign Application Priority Data

Aug. 5, 2014   (JP) .................... 2014-159463

(51) Int. Cl.
*G02B 27/01* (2006.01)
*G02B 17/00* (2006.01)

(52) U.S. Cl.
CPC ..... *G02B 27/0176* (2013.01); *G02B 27/0172* (2013.01); *G02B 17/006* (2013.01);
(Continued)

(58) Field of Classification Search
None
See application file for complete search history.

(56) References Cited

U.S. PATENT DOCUMENTS 8,576,491 B2   11/2013   Takagi et al.
8,820,996 B2    9/2014   Aiki et al.
(Continued)

FOREIGN PATENT DOCUMENTS

CN   101052915 A   10/2007
JP   2006-3879 A    1/2006
(Continued)

OTHER PUBLICATIONS

Chinese Office Action received in corresponding Chinese Application No. 201510463004.8 dated Apr. 5, 2017.
(Continued)

*Primary Examiner* — Christopher R Lamb
(74) *Attorney, Agent, or Firm* — Mattingly & Malur, PC

(57) ABSTRACT

A video projection device 001 includes a video generation section 041 that has a micro display element 003 which generates video and an illuminating optical system 002 which illuminates a micro display element; projection section 043 that project the video which is generated by the video generation section onto the eyes of a user through an eyepiece section; and a mechanical support section 042 that connects the video generation section to the projection section using a housing section. The mechanical support section includes at least one transparent area 011 that is surrounded by the housing section, and penetrates in a direction parallel to a direction in which the video from the projection section is projected. The illuminating optical system includes a light source that emits light in a plurality of wavelength bands, and a controller 440 that controls the output of the light source.

17 Claims, 18 Drawing Sheets

(52) U.S. Cl.
CPC .. *G02B 2027/014* (2013.01); *G02B 2027/015* (2013.01); *G02B 2027/0112* (2013.01); *G02B 2027/0118* (2013.01)

(56) References Cited

U.S. PATENT DOCUMENTS

| | | | |
|---|---|---|---|
| 9,042,021 B2 | 5/2015 | Nomoto et al. | |
| 2007/0058261 A1 | 3/2007 | Sugihara et al. | |
| 2007/0297061 A1 | 12/2007 | Kyomoto et al. | |
| 2008/0150879 A1* | 6/2008 | Kang | G09G 3/3413 345/102 |
| 2009/0244922 A1 | 10/2009 | Hayakawa et al. | |
| 2010/0027289 A1* | 2/2010 | Aiki | G02B 6/0011 362/558 |
| 2013/0222919 A1 | 8/2013 | Komatsu et al. | |
| 2014/0049833 A1* | 2/2014 | Totani | G02B 27/0172 359/633 |
| 2014/0055864 A1* | 2/2014 | Nomoto | G02B 27/0101 359/630 |
| 2014/0247500 A1* | 9/2014 | Takeda | G02B 27/0172 359/631 |
| 2014/0340286 A1* | 11/2014 | Machida | G02B 26/0833 345/8 |

FOREIGN PATENT DOCUMENTS

| | | |
|---|---|---|
| JP | 2006-42153 A | 2/2006 |
| JP | 2006-126644 A | 5/2006 |
| JP | 2009-244360 A | 10/2009 |
| JP | 2010-39086 A | 2/2010 |
| JP | 2012-63639 A | 3/2012 |
| JP | 2012-163660 A | 8/2012 |
| JP | 2013-200554 A | 10/2013 |
| WO | 2012/140765 A1 | 10/2012 |
| WO | WO2013/111471 * | 8/2013 ............. G02B 27/02 |

OTHER PUBLICATIONS

Japanese Office Action received in corresponding Japanese Application No. 2014-159463 dated Nov. 21, 2017.

* cited by examiner

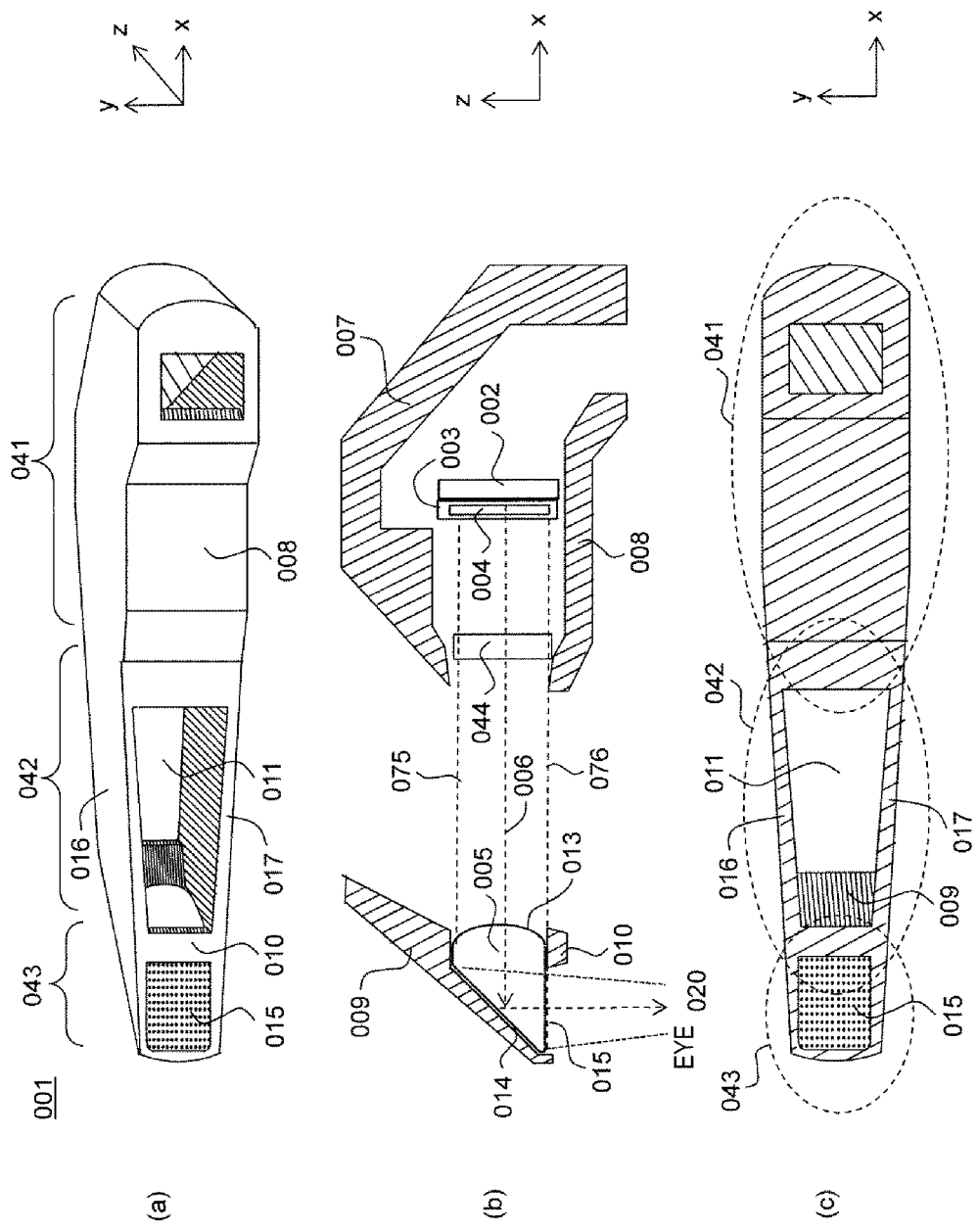
[Fig. 1]

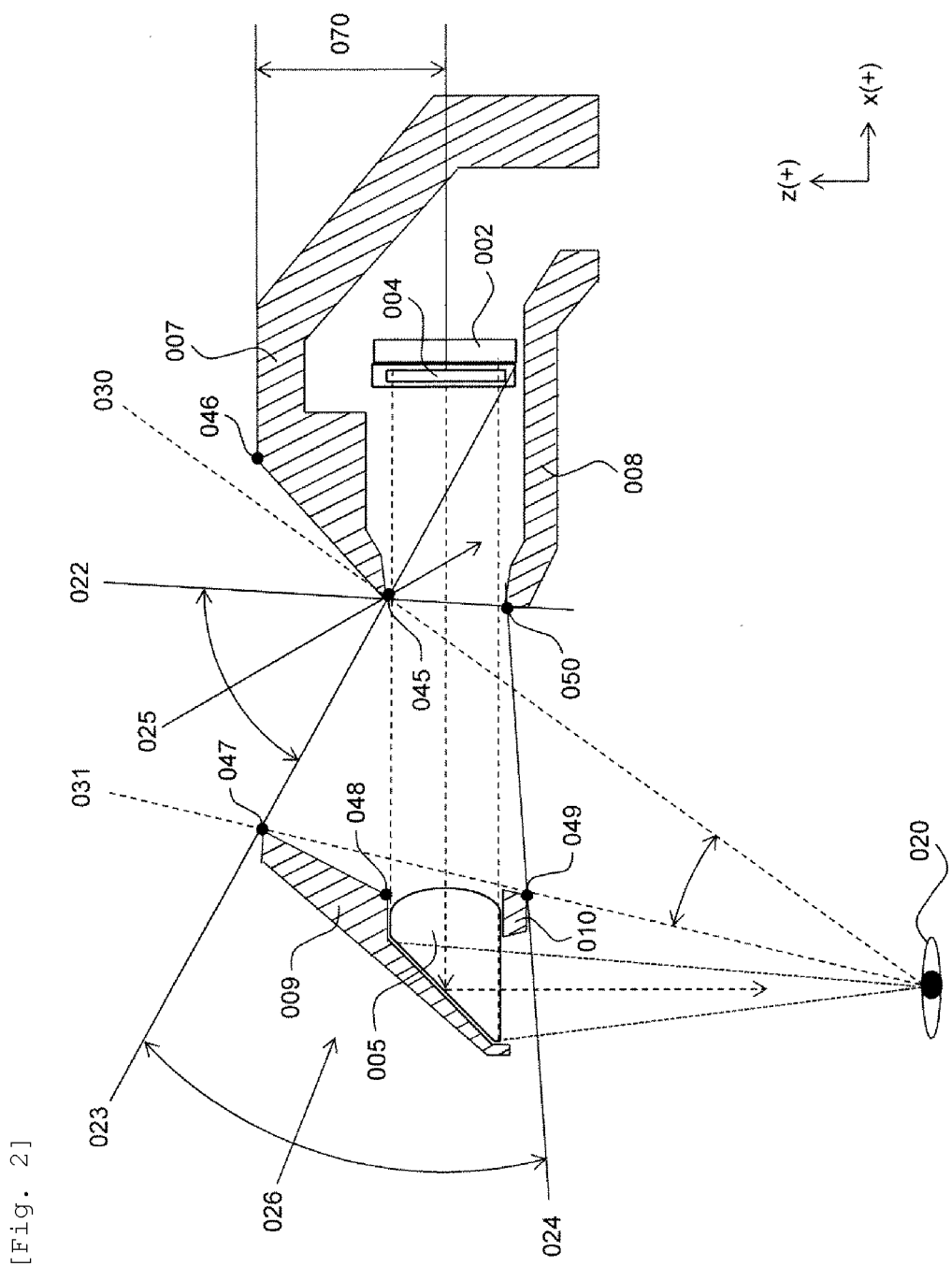
[Fig. 2]

[Fig. 3]
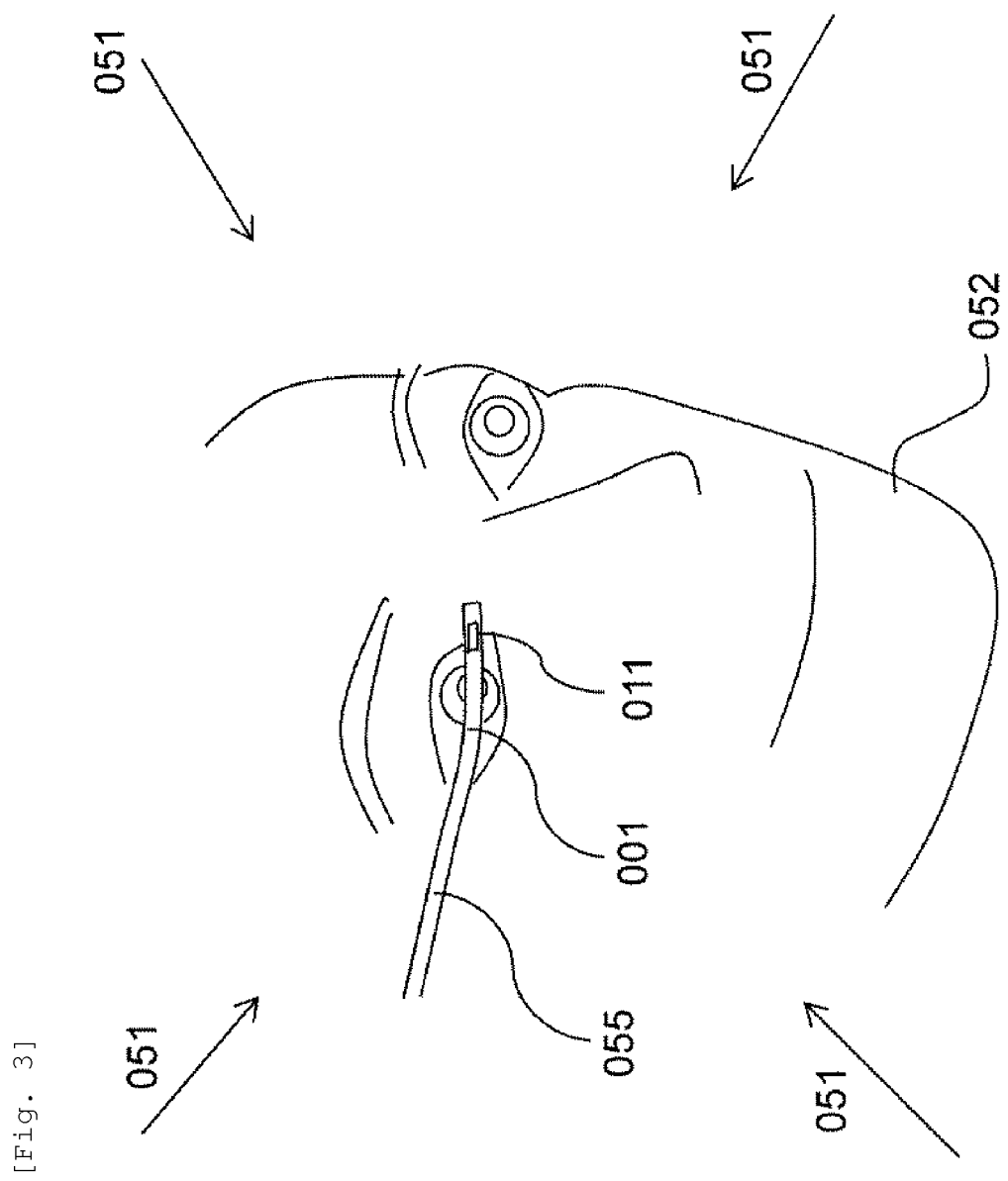

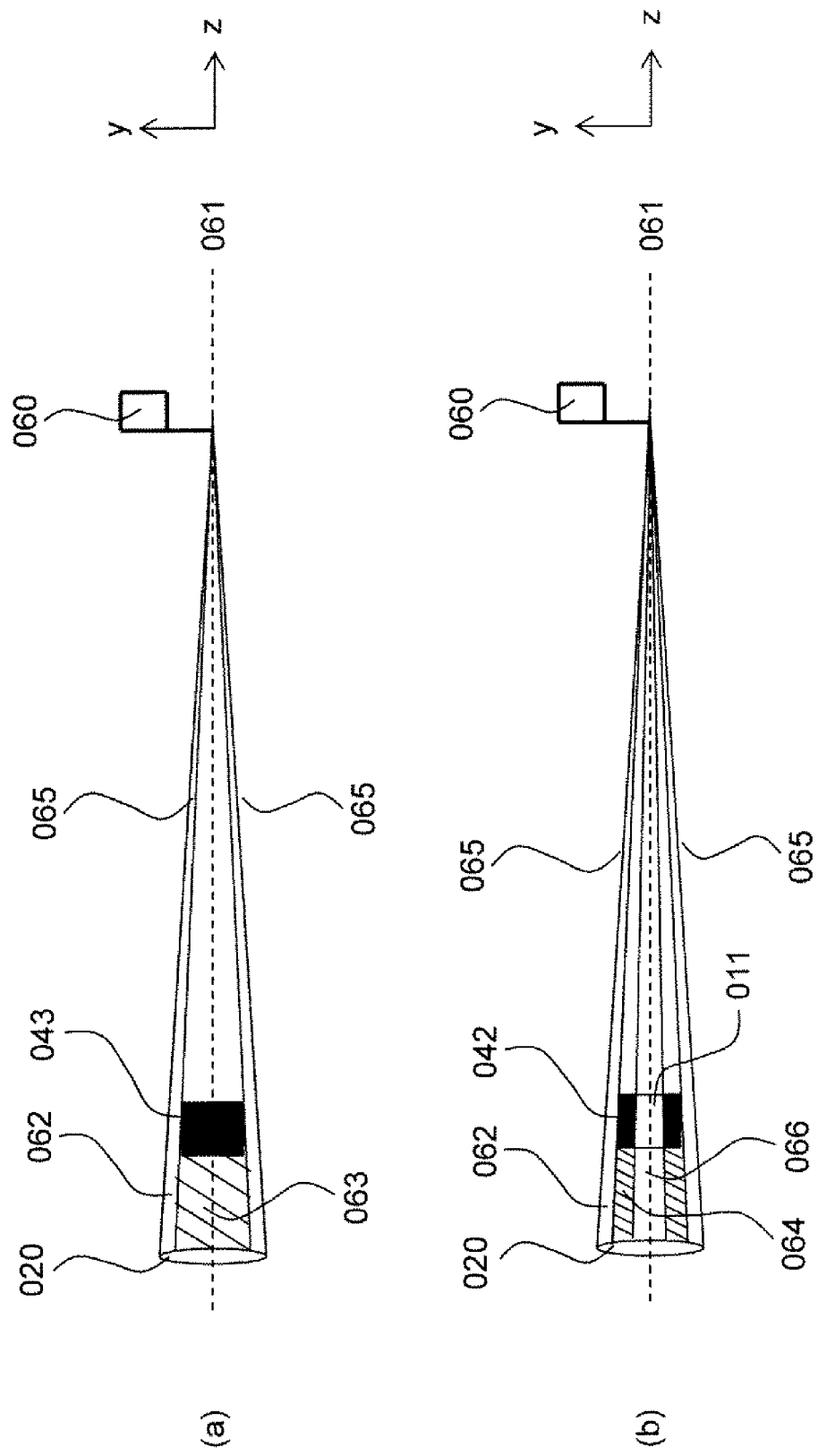
[Fig. 4]

[Fig. 5]
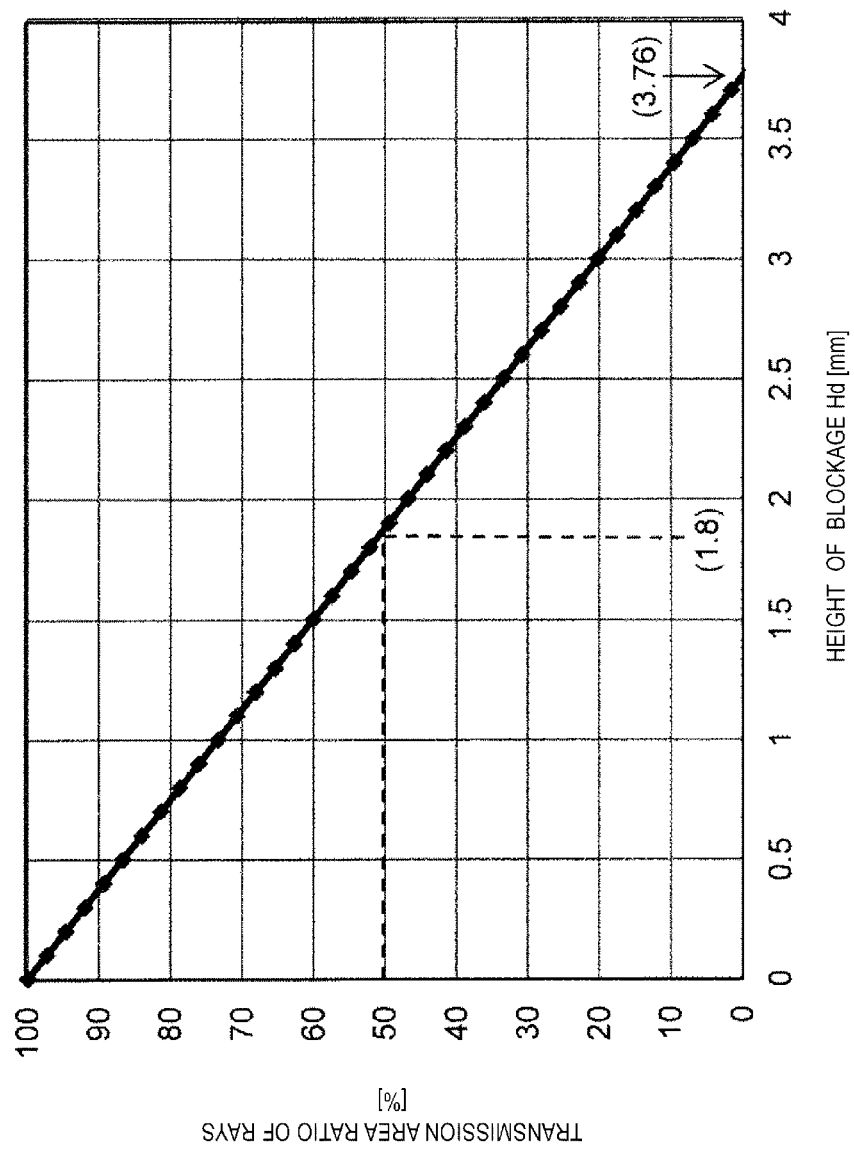

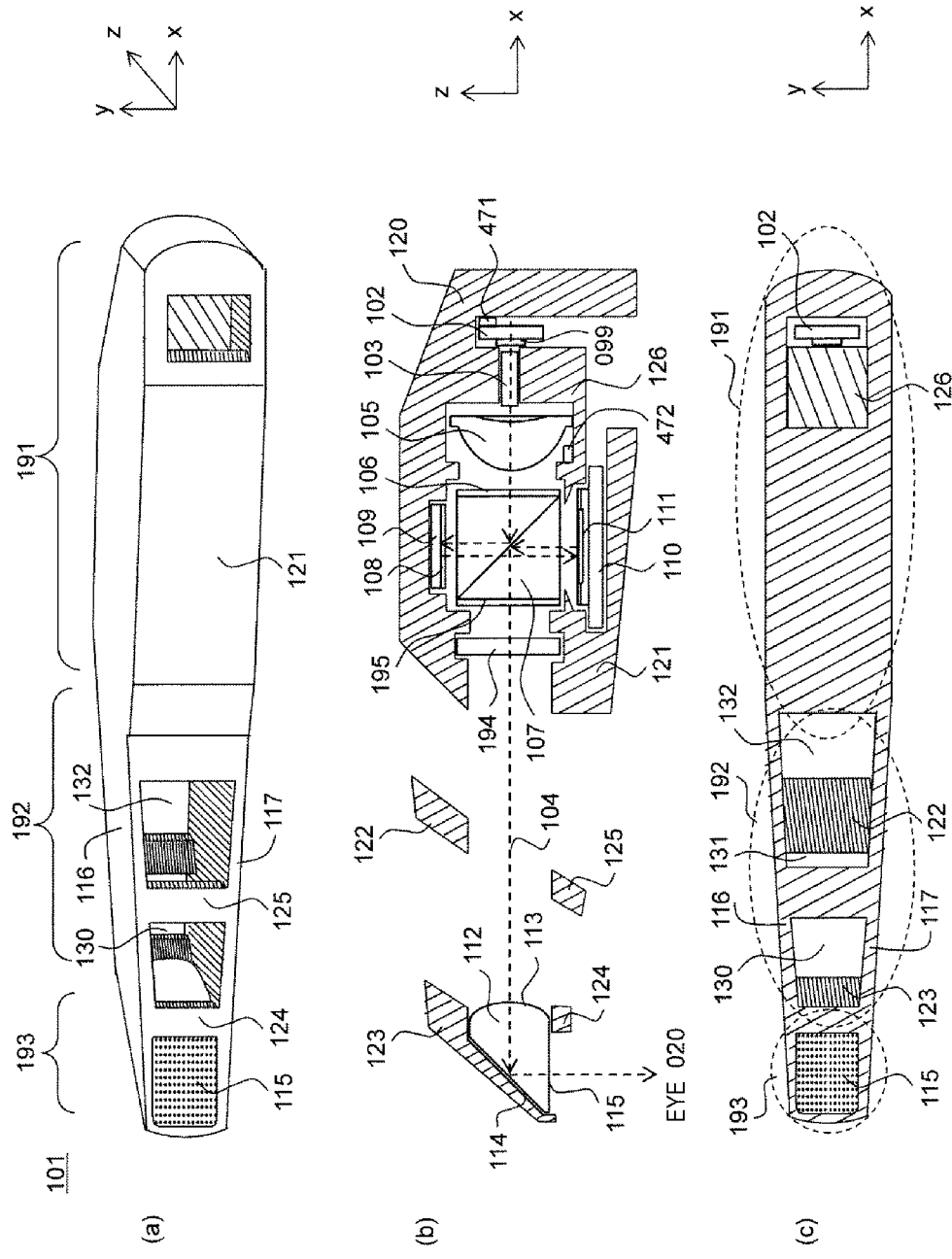
[Fig. 6]

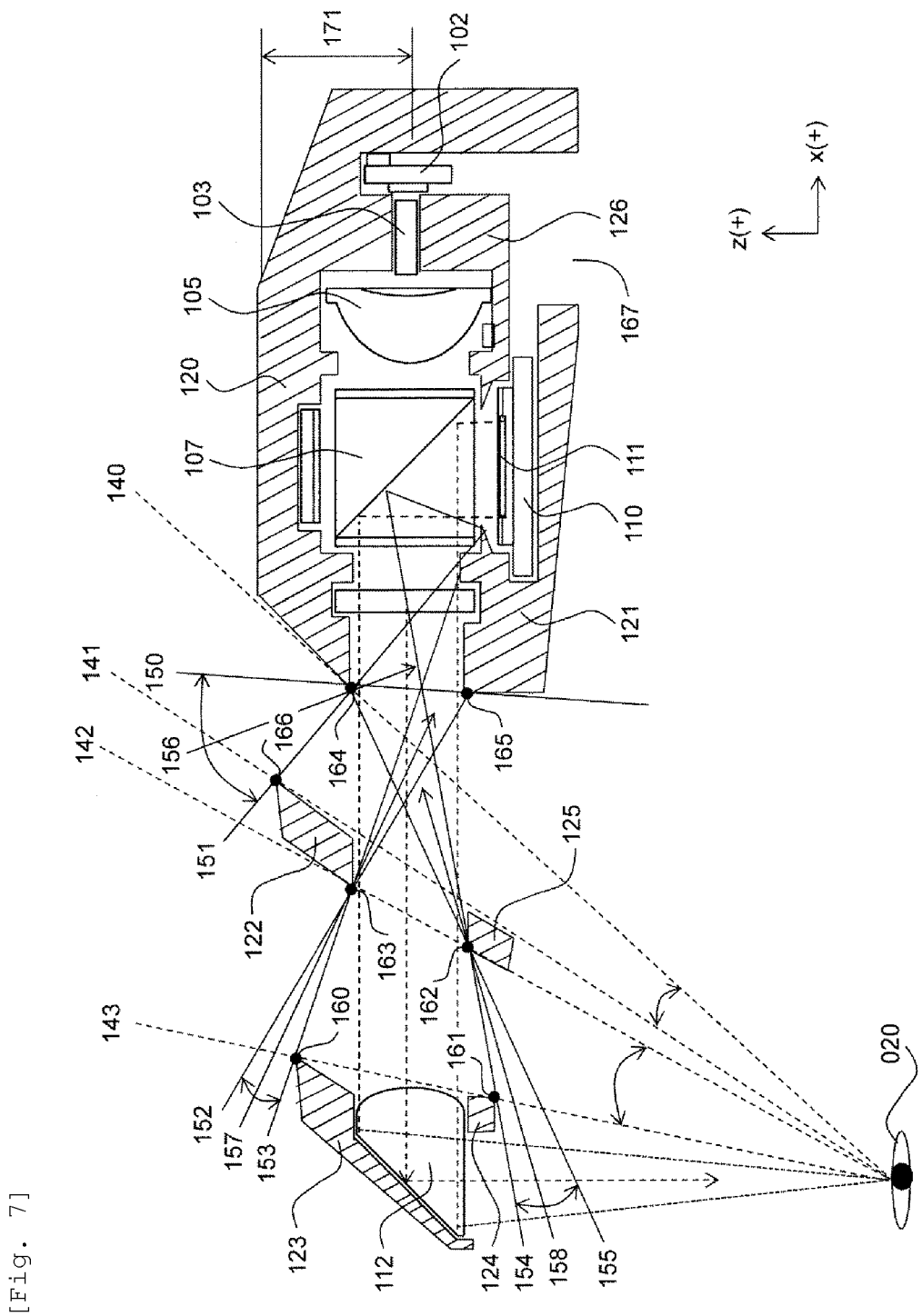
[Fig. 7]

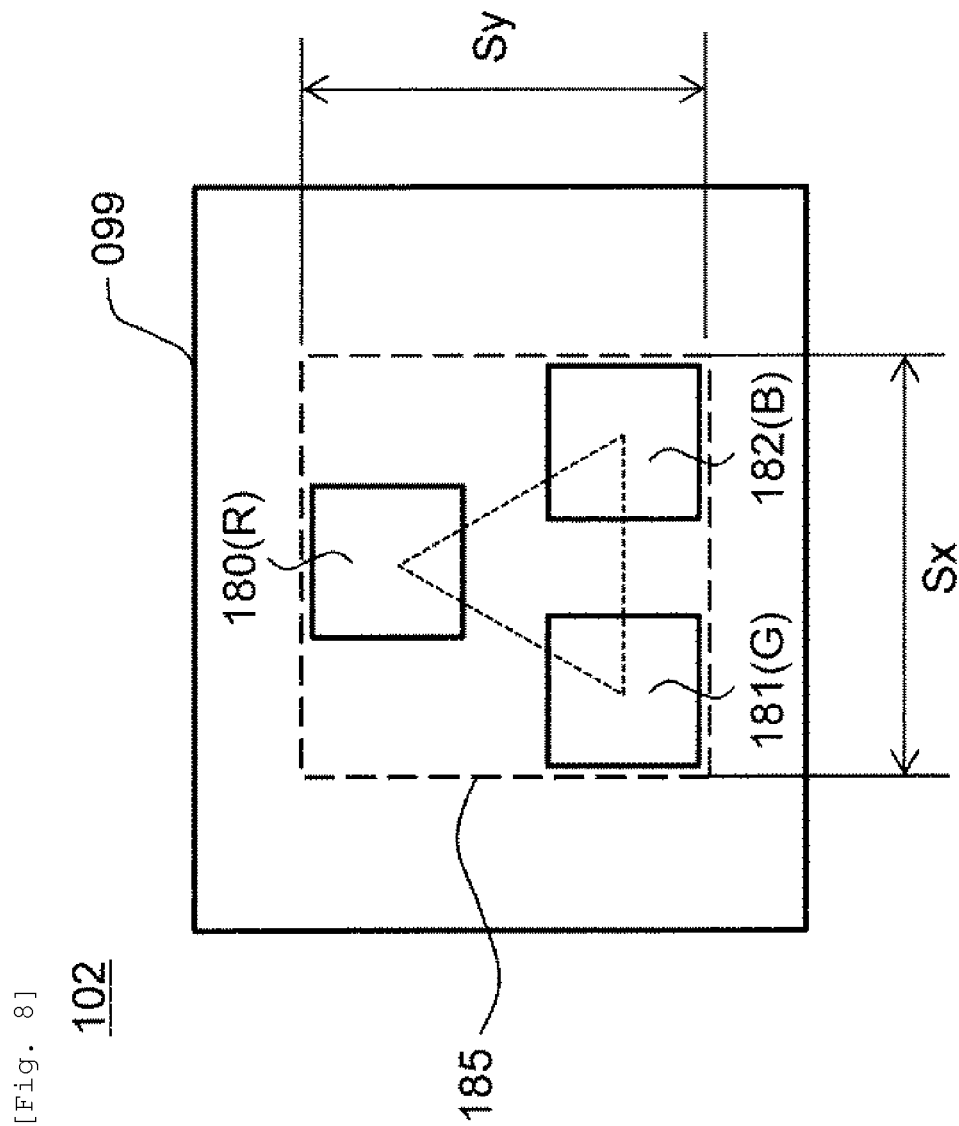

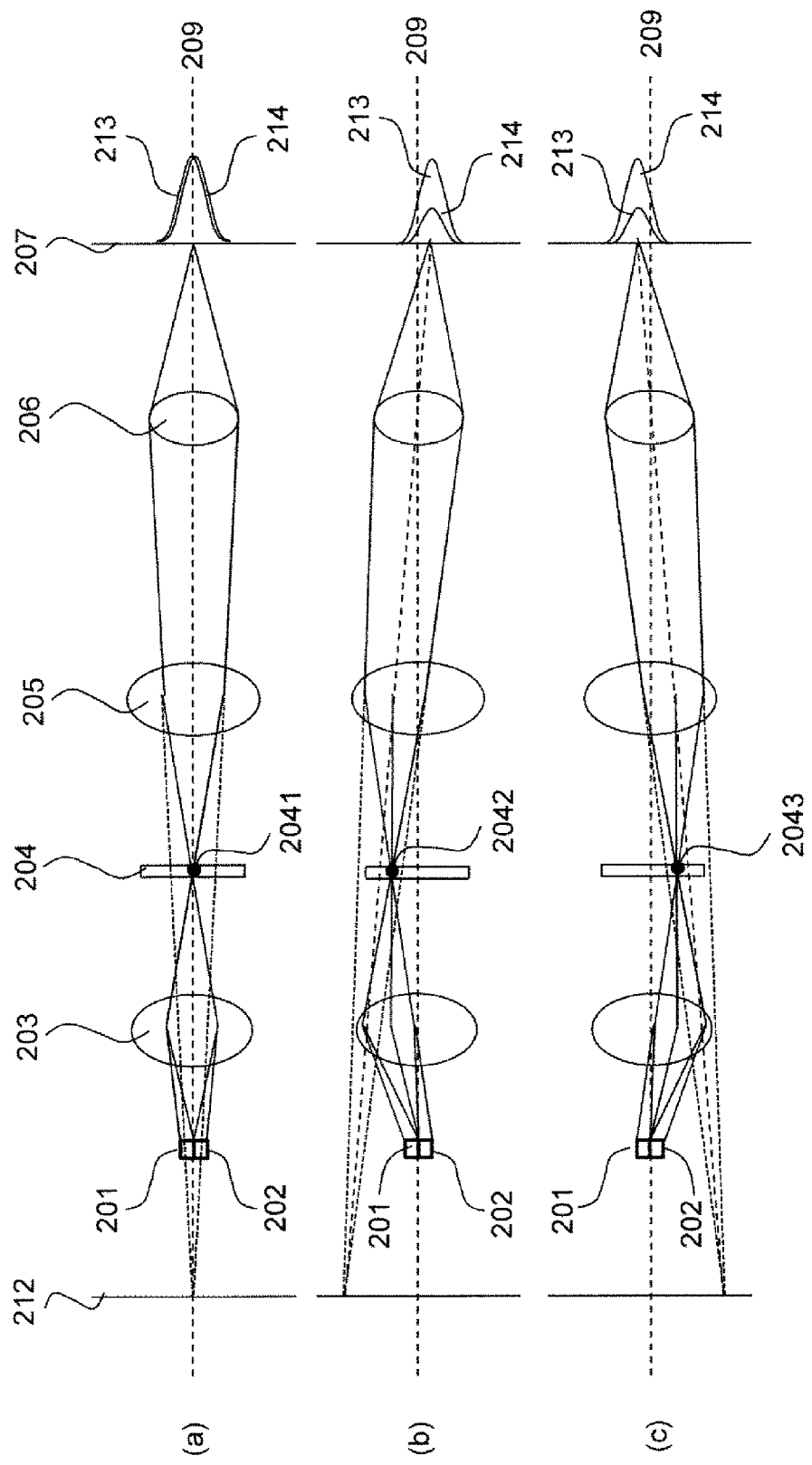
[Fig. 9]

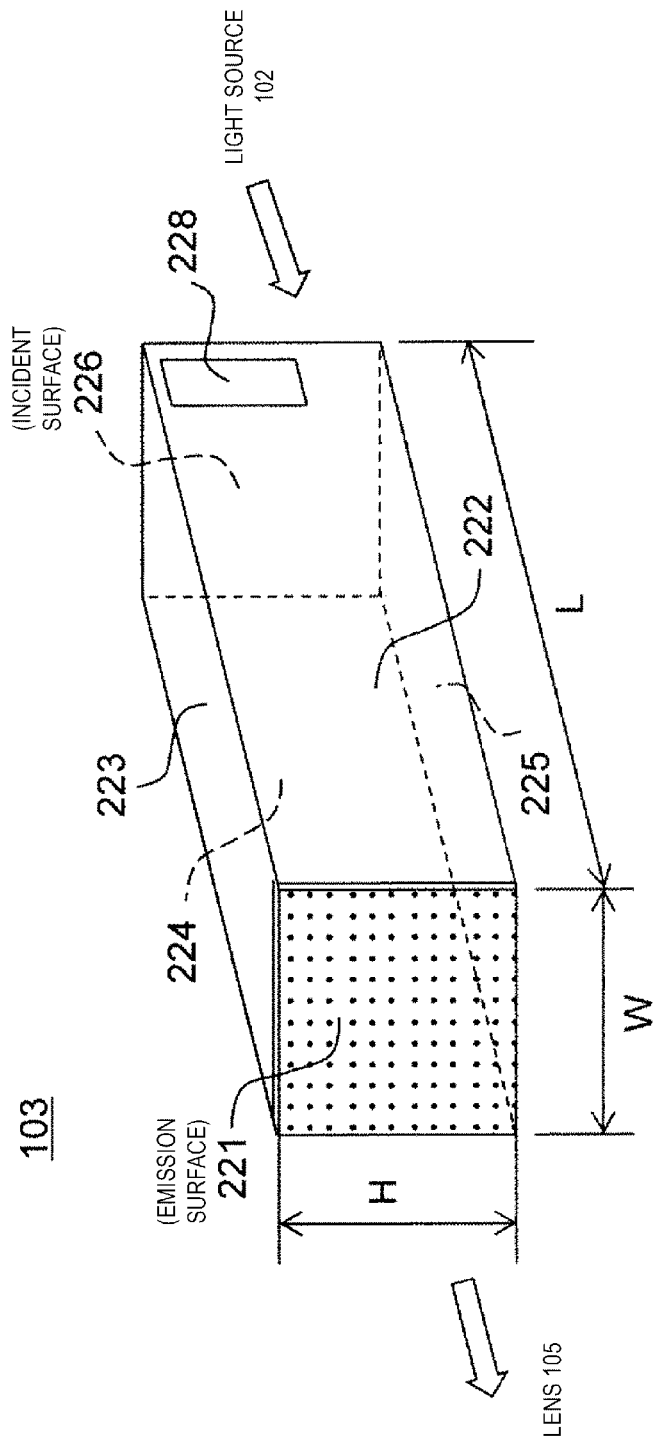

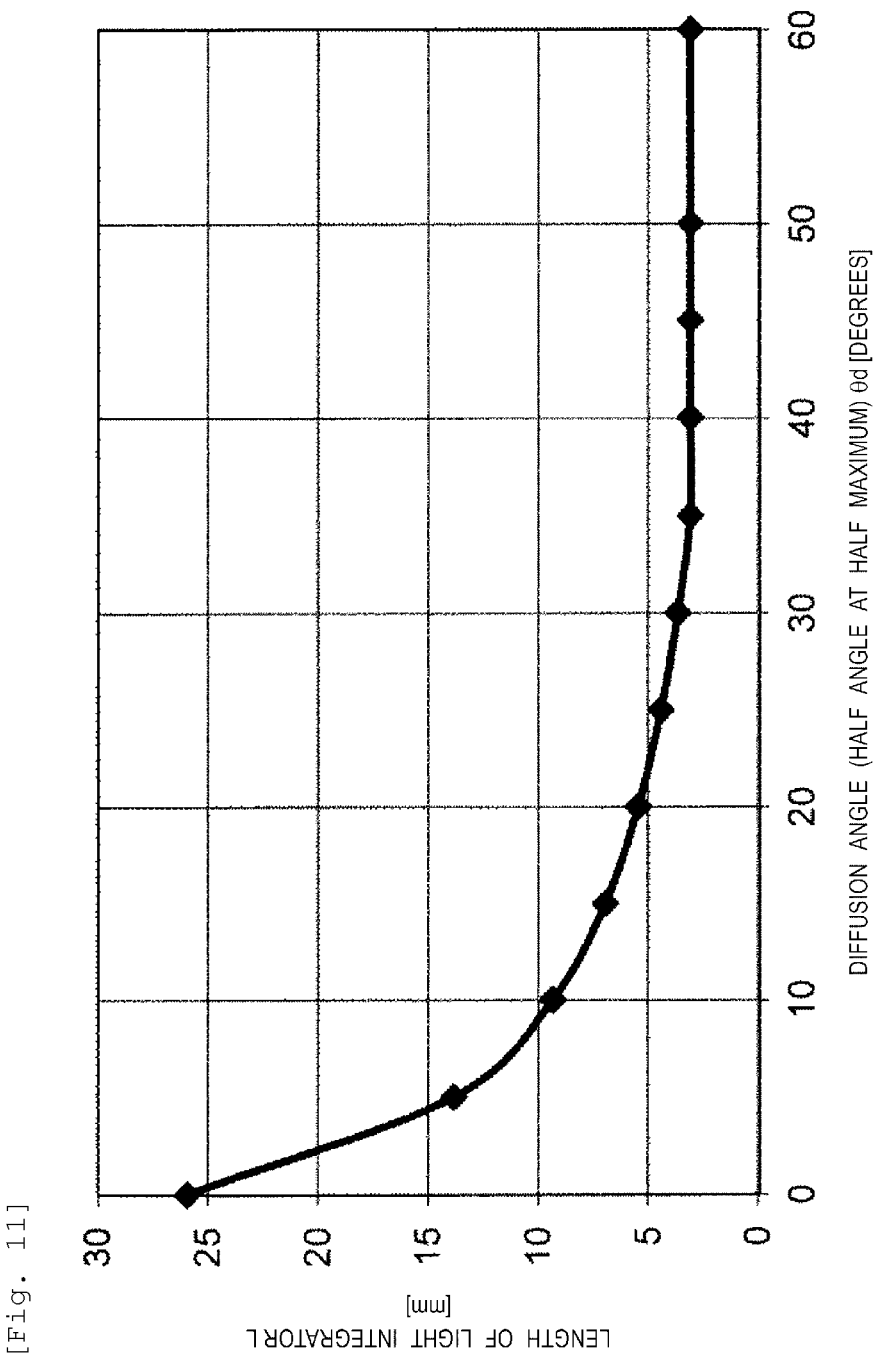
[Fig. 11]

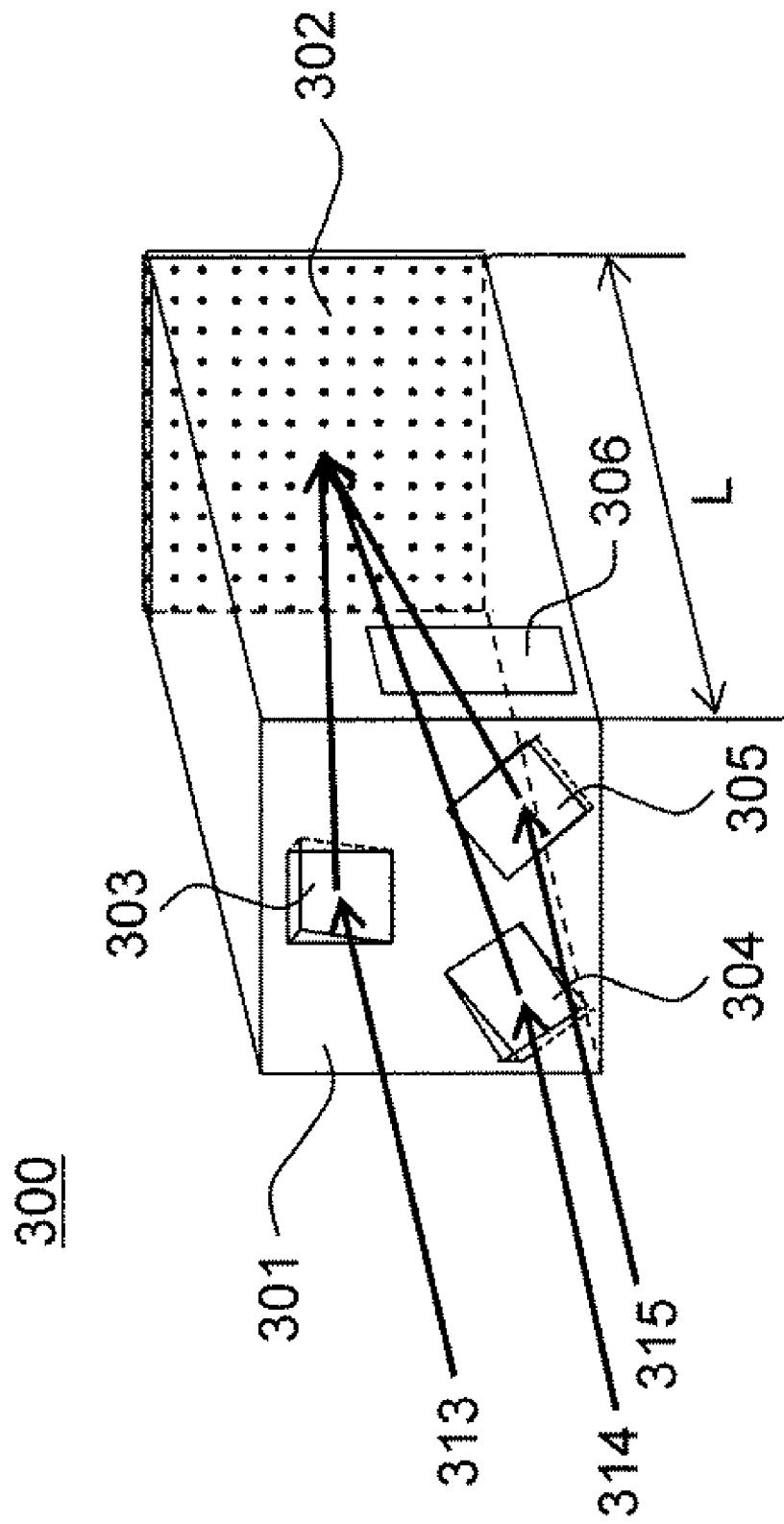
[Fig. 12]

[Fig. 13]
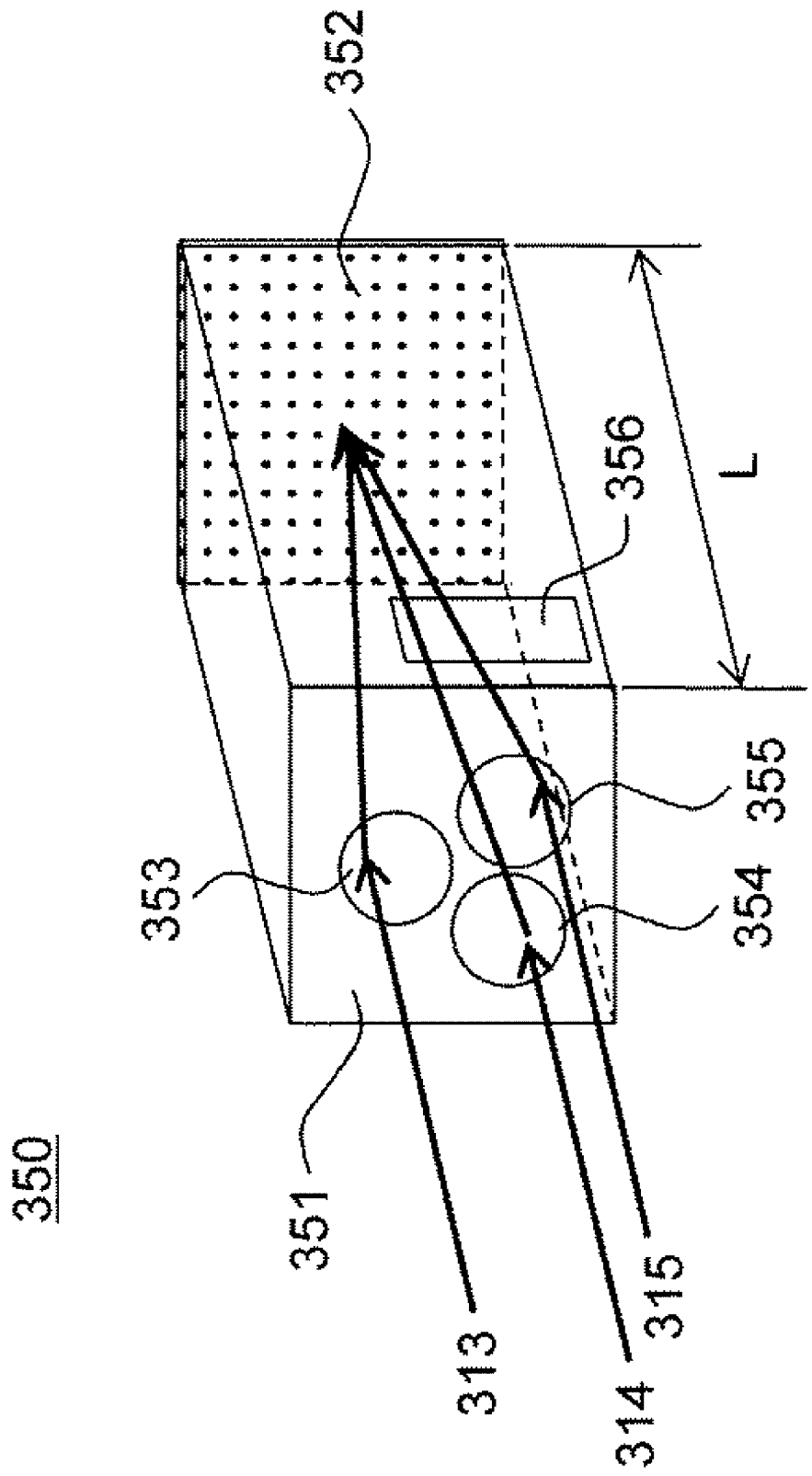

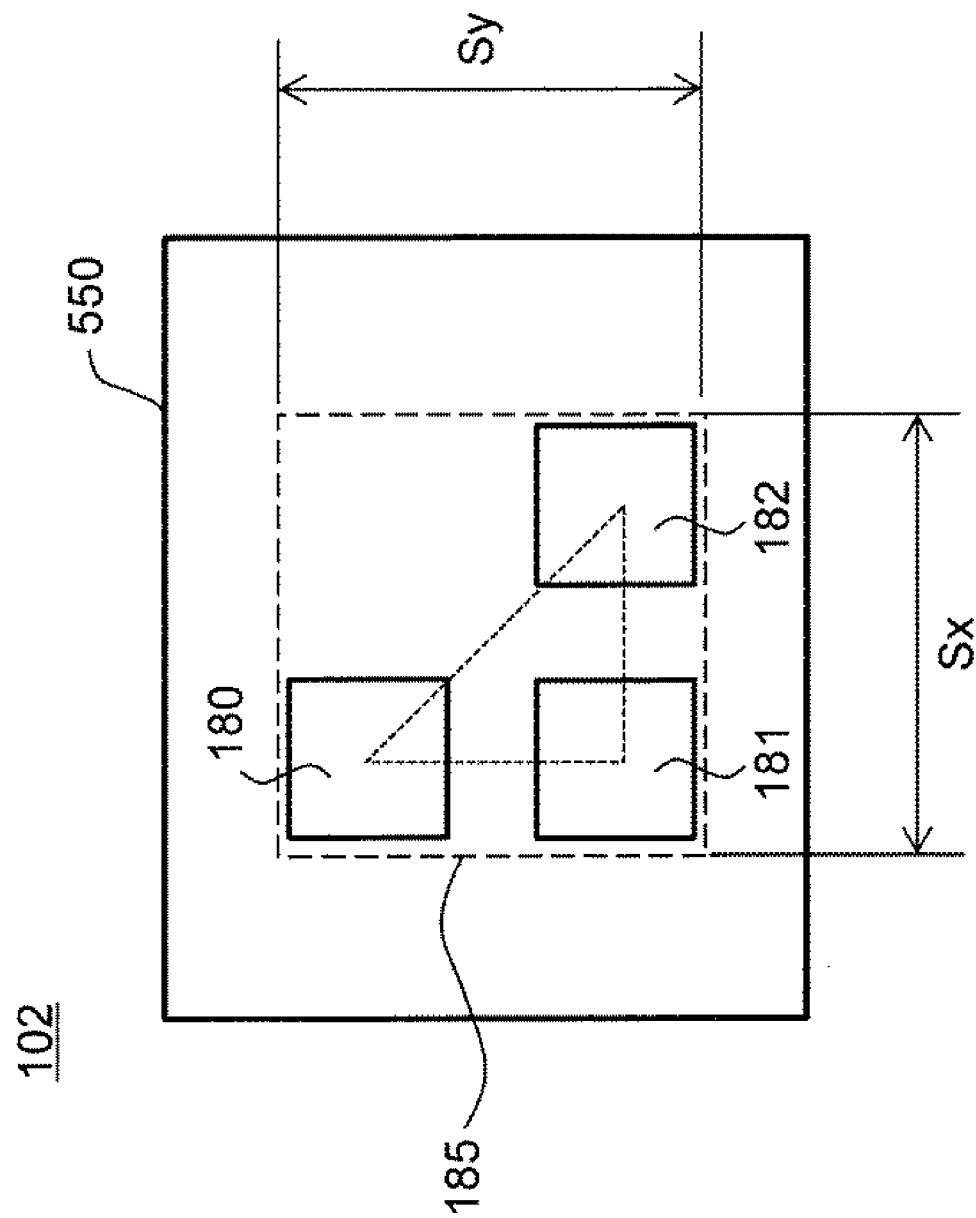

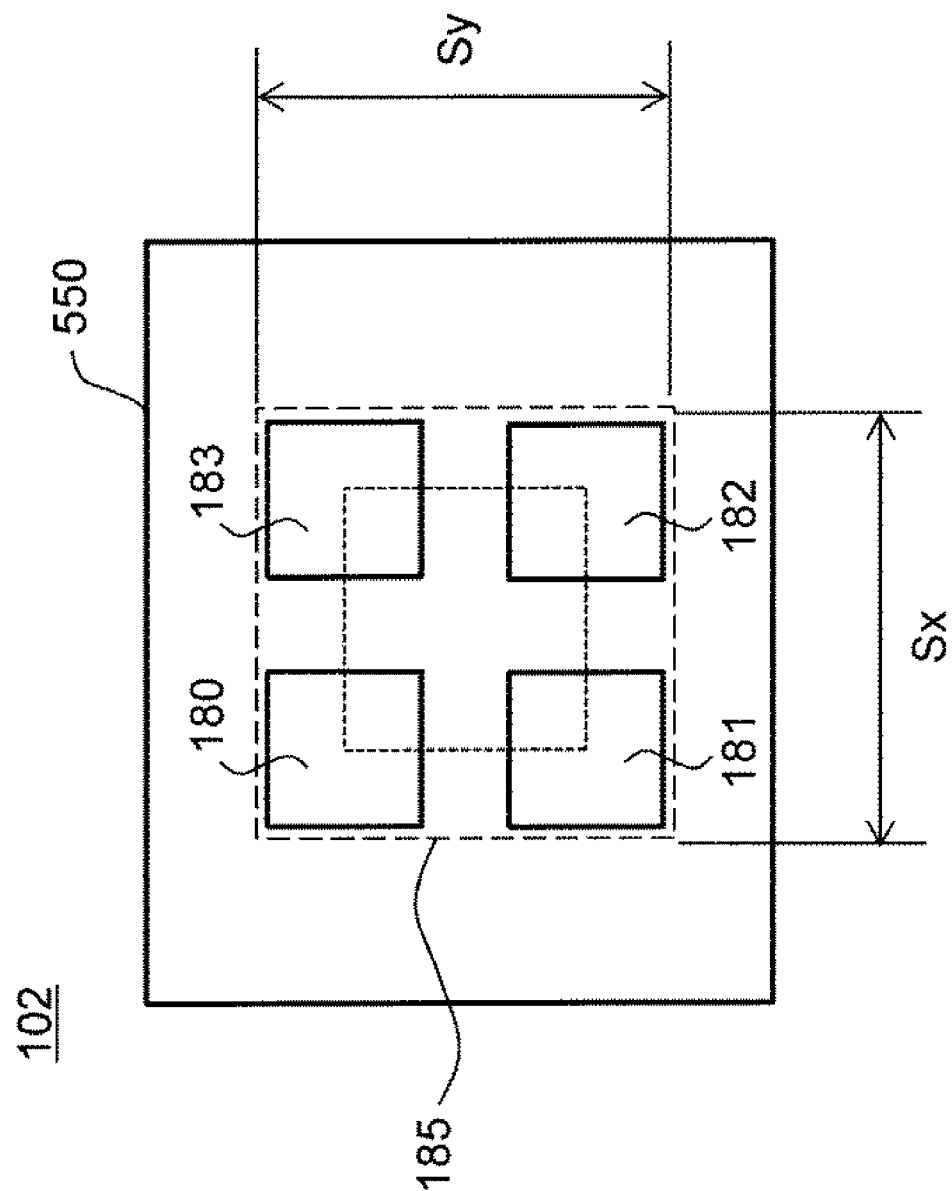
[Fig. 15]

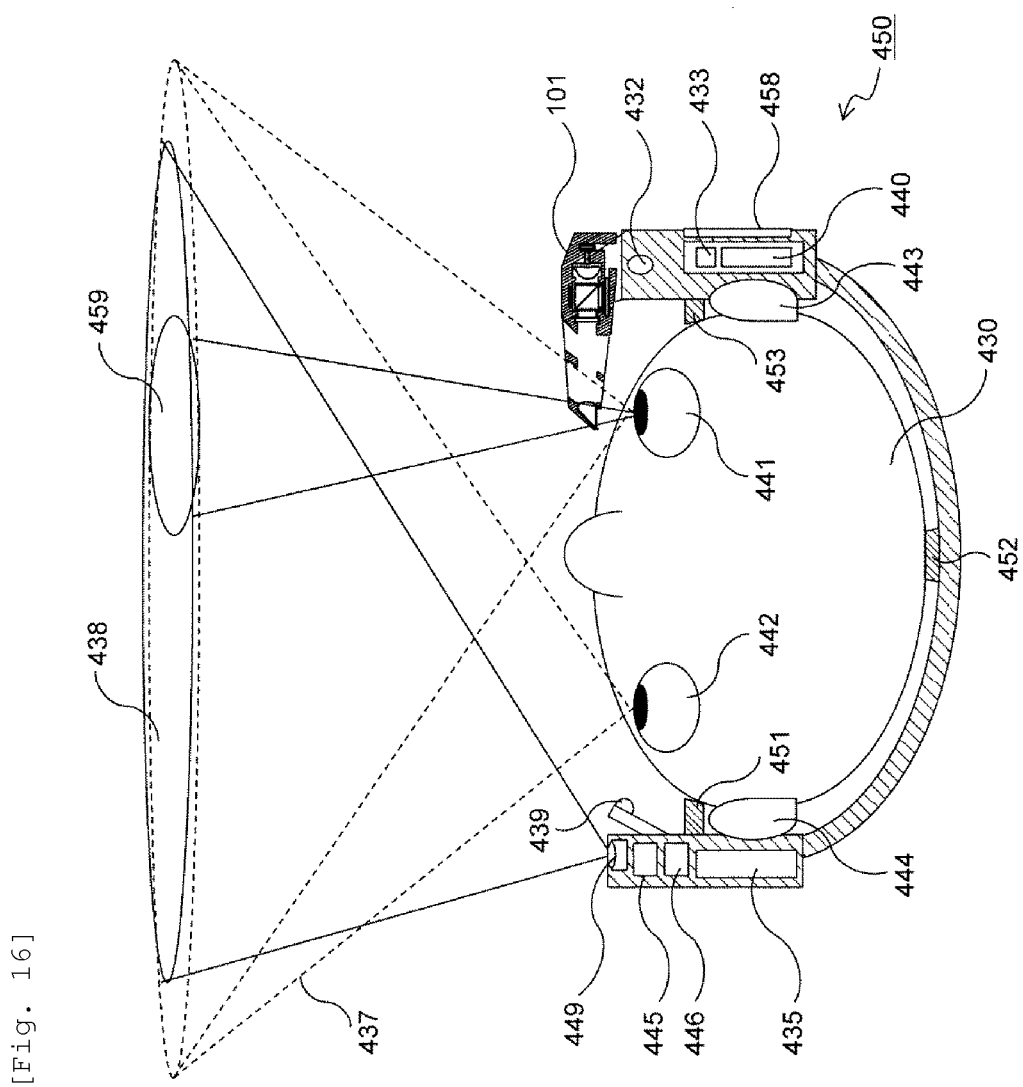
[Fig. 16]

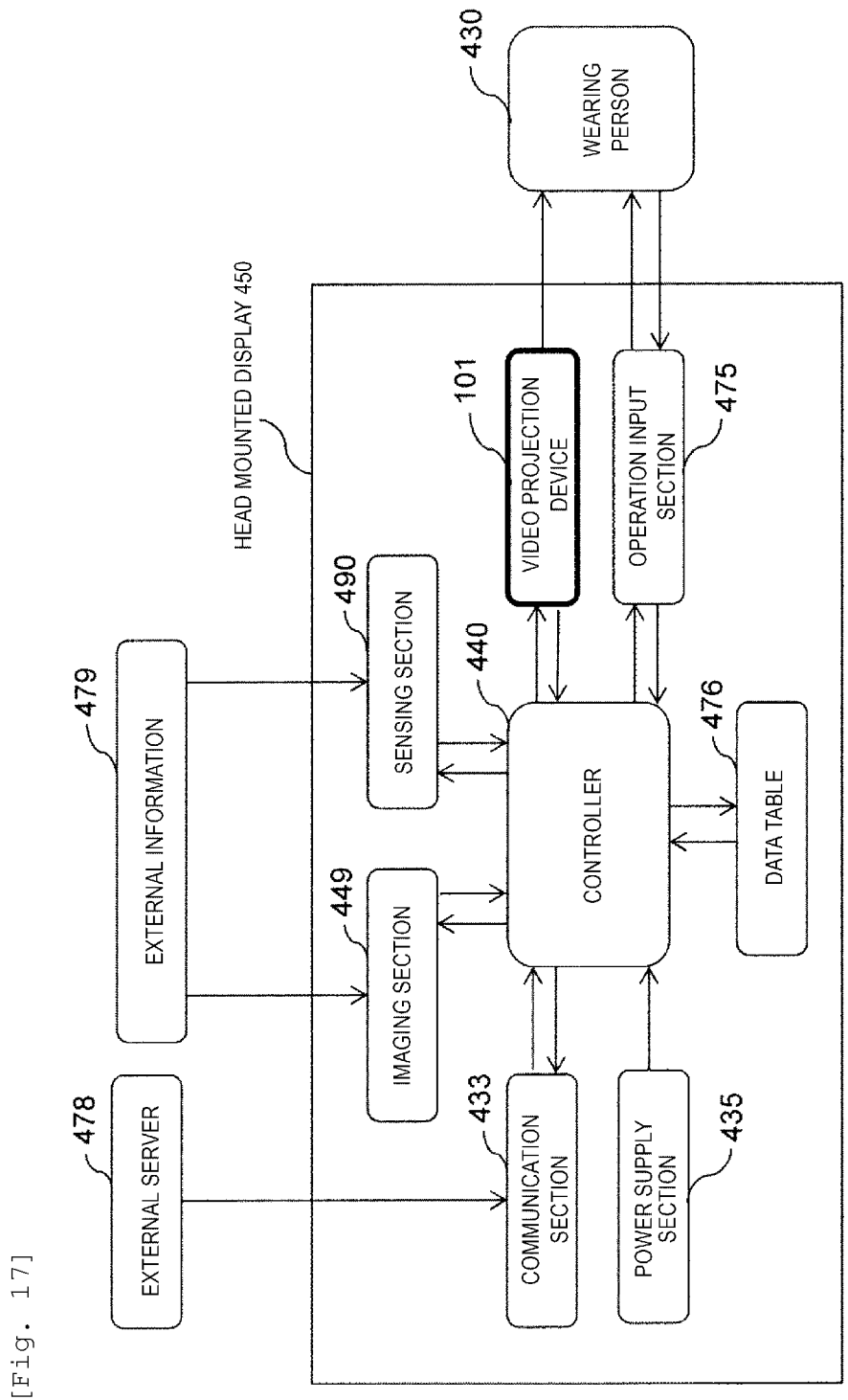

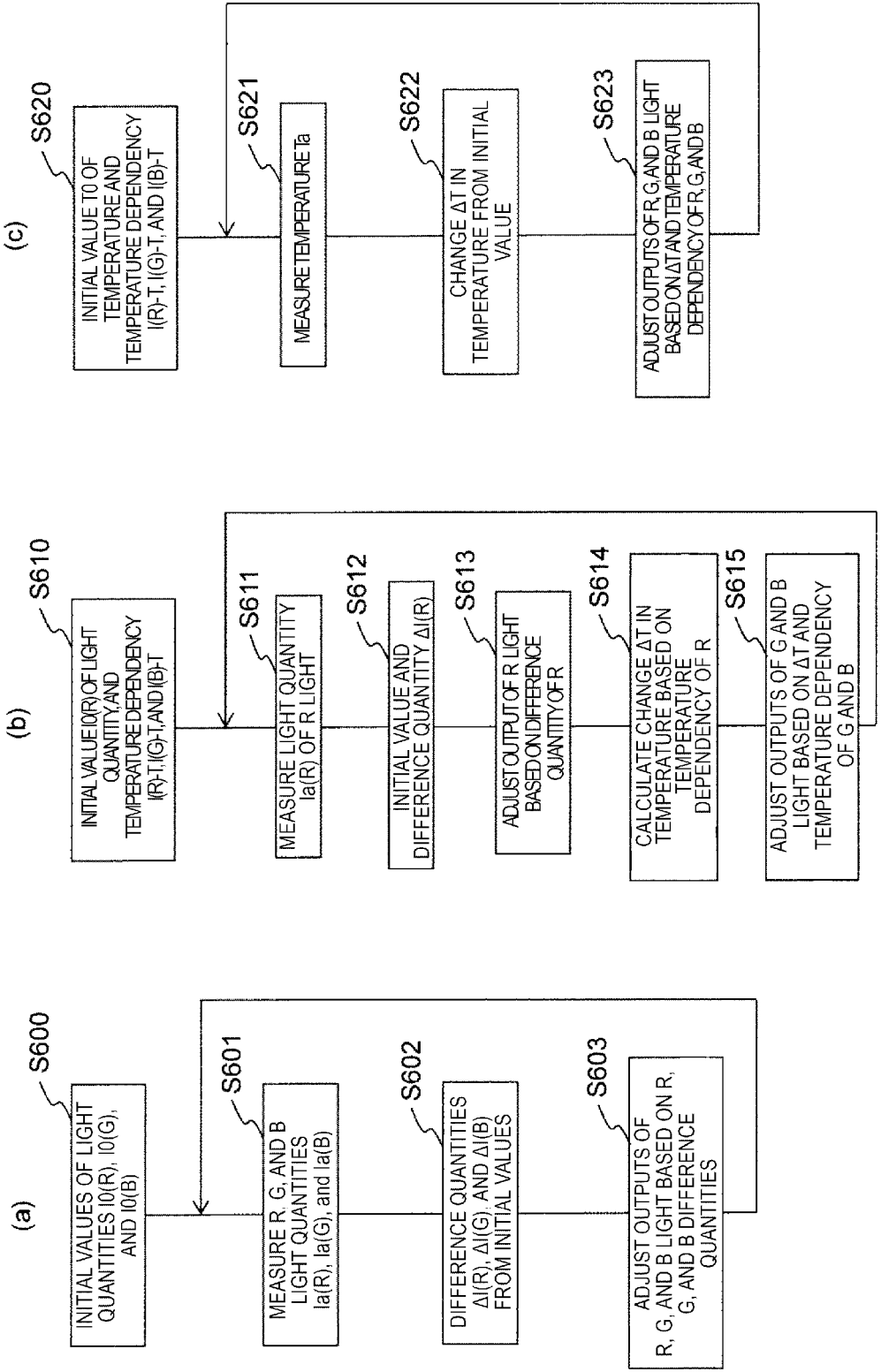
[Fig. 18]

VIDEO PROJECTION DEVICE AND HEAD MOUNTED DISPLAY USING THE SAME

CROSS-REFERENCE TO RELATED APPLICATION

The present application claims priority from Japanese patent application serial No. JP 2014-159463, filed Aug. 5, 2014, which is incorporated herein by reference in its entirety.

TECHNICAL FIELD

The present invention relates to a video projection device which projects video onto eyes, and a head mounted display using the same.

BACKGROUND ART

A head mounted display as a wearable device enables network information or the like on the Internet to be usually obtained at a part of the field of vision, thereby enabling various applications to be developed. In the head mounted display, video is usually displayed at a part of the field of vision. Therefore, it is necessary to cause external world information other than the video to be easily acquired, that is, a see-through function is necessary.

For example, in PTL 1, a member which forms an eyepiece aperture holding section has a see-around function while having a width of 4 mm or less in a projection section taken in the direction of the visual axis of a user within a range of 10 mm or more from the eyepiece aperture to the root except a partial protrusion. In addition, a display device is disclosed in which the member which forms the eyepiece aperture has the see-through function while having a width of 4 mm or less in the projection section taken in the direction of the visual axis of the user.

In addition, the optical efficiency is improved by equalizing the brightness distribution of an illuminating optical system. Therefore, for example, PTL 2 discloses a structure in which a diffraction section is provided in an area on the side of the incident opening of the sidewall surface of a light pipe.

CITATION LIST

Patent Literature

[PTL 1] JP-A-2006-3879
[PTL 2] JP-A-2009-244360

SUMMARY OF INVENTION

Technical Problem

In the head mounted display, it is necessary to easily acquire external world information (see-through function) other than video, and to reduce the size and power thereof.

However, in the configuration disclosed in PTL 1, an area, which is blocked by the eyepiece aperture holding section, has bad transmittance and a blocked external world image, thereby disturbing the see-through function. In addition, a total reflection optical element is used to cause an optical axis to curve in the direction of the eyes of the user. However, the size of the light source is greater than a micro display element, and thus the optical efficiency of the illuminating optical system is deteriorated.

In addition, although the light pipe disclosed in PTL 2 is capable of improving the optical efficiency from the light source, it is difficult to reduce the size thereof. That is, although it is possible to apply the light pipe disclosed in PTL 2 to a large-sized device, such as a projector according to the related art, it is difficult to apply the light pipe disclosed in PTL 2 to a small-sized device such as a head mounted display.

An object of the present invention is to provide a video projection device and a head mounted display, which are capable of realizing a see-through function and improvement of the optical efficiency of an illuminating optical system in a small space.

Solution to Problem

According to the aspect of the present invention, there is provided a video projection device comprising: a video generation section that includes a micro display element which generates the video, and an illuminating optical system which illuminates the micro display element; a projection section that projects the video, which is generated by the video generation section, onto the eye of the user through an eyepiece section; and a mechanical support section that connects the video generation section to the projection section using a housing section, wherein the mechanical support section is surrounded by the housing section between the video generation section and the projection section, and includes at least one transparent area which penetrates in a direction parallel to a direction into which the video from the projection section is projected.

In addition, the head mounted display according to the present invention includes the video projection device that is mounted thereon. The illuminating optical system includes a light source that emits light in a plurality of wavelength bands, and a controller that controls video which is projected from the video projection device and that controls the output of the light source.

Advantageous Effects of Invention

According to the present invention, it is possible to realize the video projection device and the head mounted display, which have an easily visible see-through function, which have small sizes, and which save power.

BRIEF DESCRIPTION OF DRAWINGS

FIG. 1 is a diagram illustrating the configuration of a video projection device according to a first embodiment.
FIG. 2 is a diagram illustrating a structure of blocking external light.
FIG. 3 is a diagram illustrating directions at which external light arrives.
FIG. 4 is a sectional diagram illustrating rays which reach eyes from a front object.
FIG. 5 is a graph illustrating the relationship between the height of a blockage and a transmission area ratio of the rays which are delivered to the eyes.
FIG. 6 is a diagram illustrating the configuration of a video projection device according to a second embodiment.
FIG. 7 is a diagram illustrating a structure of blocking external light.
FIG. 8 is a diagram illustrating the configuration of the light emission surface of a light source.
FIG. 9 is a diagram illustrating the object point and the image formation point of an optical system.

FIG. 10 is a diagram illustrating the configuration of a light integrator.

FIG. 11 is a diagram illustrating the relationship between the length L and diffusion angle θd of a light integrator.

FIG. 12 is a diagram illustrating a first modification example (third embodiment) of the light integrator.

FIG. 13 is a diagram illustrating a second modification example of the light integrator.

FIG. 14 is a diagram illustrating a first modification example of the light source.

FIG. 15 is a diagram illustrating a second modification example of the light source.

FIG. 16 is a diagram illustrating a state of a head mounted display (fourth embodiment).

FIG. 17 is a block diagram illustrating the functional configuration of the head mounted display.

FIG. 18 is a flowchart illustrating control performed on the output of the light source.

DESCRIPTION OF EMBODIMENTS

Hereinafter, embodiments of the present invention will be described with reference to the accompanying drawings.

First Embodiment

FIG. 1 is a diagram illustrating the configuration of a video projection device 001 according to a first embodiment. FIG. 1(a) is a perspective view of an external appearance, FIG. 1(b) is a top view (sectional view) which is viewed from above (y direction of) the eye, and FIG. 1(c) is a side view which is viewed from the side of the eye (z direction). Meanwhile, in the drawing, x, y, and z axes are described in order to describe the directions.

The video projection device 001 includes a video generation section 041 that generates video, a projection section 043 that projects the video onto an eye, and a mechanical support section 042 that connects the video generation section 041 and the projection section 043. A user (wearing person) can watch the video from the emission section (eyepiece section) 015 of the projection section 043. The structures of the respective sections will be described.

The video generation section 041 includes a light source 002, a micro display element 003 that generates the video, and a protective plate 044. The light source 002 uses, for example, a white backlight LED. The micro display element 003 is, for example, a liquid crystal element that includes red, green, blue color filters for each pixel, and the area 004 of the micro display element 003 indicates an area (video display area) in which the video is displayed. Here, the light emitting surface of the light source 002 has a size that is greater than that of the video display area 004. The light source 002 that irradiates the micro display element 003 with illumination light is called an illuminating optical system.

The protective plate 044 is an optically transparent plate, and prevents dust and water droplets from entering. Further, the protective plate 044 forms an antireflection film in a band (in a range of a wavelength of 430 nm to 670 nm) from red to blue, and thus it is possible to reduce the loss of light efficiency.

The video generation section 041 generates the video when light which is emitted from the light source 002 passes through the video display area 004. The video which is generated by the video generation section 041 is emitted from the protective plate 044, passes through the space in the mechanical support section 042, and is propagated into the projection section 043.

The projection section 043 includes a lens unit 005, and the lens unit 005 includes a lens section 013, a reflection section 014, and an emission section (eyepiece section) 015. The lens section 013 is a lens which has a focal distance F. When setting is made such that a distance A, which ranges from the video display area 004 of the micro display element 003 to the lens section 013, is shorter than the focal distance F (A<F), video which is projected onto the eye 020 becomes a virtual image. It is possible to calculate a distance Li from the eye 020 to the lens section 013 using the focal distance F and the distance A in Equation 1 for a general lens.

$$1/Li = 1/F - 1/A \qquad (1)$$

where Li indicates a virtual image and Li has a minus sign.

The reflection section 014 is a mirror which projects video onto the eye 020 by causing the progressing direction of the video which progresses from the lens section 013 to curve. Meanwhile, a dotted line 006 indicates the progress of video light, and dotted lines 075 and 076 are included in a video light propagation range. The emission section 015 is a plane, and is the last optical surface which is emitted to the eye 020. Meanwhile, it is desirable to perform hard coating on the lens section 013, the emission section 015, and the protective plate 044 such that dust, water droplets, and hand oil are not attached and fixed thereto.

The mechanical support section 042 is a mechanism which connects the video generation section 041 and the projection section 043, and is formed to avoid a space (area which is surrounded by the dotted lines 075 and 076) in which the video is propagated into projection section 043 from the video generation section 041.

As illustrated in FIGS. 1(a) and 1(c), the upper surface and the lower surface (y direction) of the video projection device 001 are covered by housing sections 016 and 017. The housing sections 016 and 017 have functions of connecting and supporting the video generation section 041 to the projection section 043 and blocking external light which intrudes into the inside of the device (the micro display element 003 or the like) from up and down directions of the video projection device 001.

In addition, as illustrated in FIG. 1(b), the side surfaces of the video projection device 001 include housing sections 007, 008, 009, and 010. The housing sections 007 and 008 thereof are mechanisms which mainly form the video generation section 041, and the housing sections 009 and 010 are mechanisms which mainly form the projection section 043. Further, as illustrated in FIGS. 1(a) and 1(c), when viewed from the side of the eye (z direction), a transparent area 011 which transmits in the z direction is formed between the housing sections 007 and 008 and the housing sections 009 and 010. When the transparent area 011 is formed, a see-through function is improved. Here, although the transparent area 011 has a space, a transparent plate or a transparent film for protection, which is formed of a resin or glass, may be provided. In such a case, it is desirable to improve resistance to staining by performing hard coating on the transparent plate or the transparent film.

Here, the effect of external light and a reason for blocking external light will be described.

FIG. 3 is a diagram illustrating directions at which external light arrives. External light includes sunlight, indoor fluorescent lamp, or the like, and arrives at a user 052 who wears a head mounted display 055 from all directions indicated by arrows 051.

There is a case in which such external light 051 is incident to the inside of the video projection device 001, which is mounted on the tip of the head mounted display 055, from, particularly, the transparent area 011. Further, when external light intrudes into the micro display element 003 (the video display area 004) of the video generation section 041, the video display area 004 shines brightly, and thus a problem occurs in which it is difficult to see original video. Further, when external light is incident into the video display area 004, video which is being displayed is emitted to directions other than an originally propagated direction, and there is a case in which the video is seen by a person other than the wearing person 052. Accordingly, it is difficult to secure the confidentiality of the video which is seen by the user.

In the embodiment, in order to block external light which arrives from the front of the eye and to secure the confidentiality of video, a configuration as below is provided.

FIG. 2 is a diagram illustrating a structure for blocking external light in the video projection device 001. FIG. 2 is acquired by adding lines of external light to the top view (sectional view) of FIG. 1(*b*).

It is a problem that the external light arrives from a range between a line 022 and a line 024. The other light, which arrives from the right side of the paper (+x direction) rather than the line 022, is blocked by the housing section 007, and thus it may not be a problem. In addition, light, which arrives from the bottom side of the paper (−z direction) rather than the line 024, is blocked by the face of the wearing person, and thus it may not be a problem.

In the video projection device 001 according to the embodiment, the end positions 045 to 050 of the respective housing sections 007 to 010 are set such that external light is not incident into the video display area 004. A method of setting the end positions will be described.

First, external light (arrow 025) which arrives from the front of the wearing person (+z direction) will be described. Tangent lines 030 and 031 are drawn from the eye 020 to the side of the transparent area 011 of the housing sections 007 and 009, and the contact points thereof are set to 045 and 047. The end positions 045 and 047 of the housing sections 007 and 009 are set such that a line 023, which connects the contact points 045 and 047, does not cross the video display area 004. In addition, setting is made such that the end position 050 of the housing section 008 is on the side of the light source 002 (right side on the paper) rather than the tangent line 030. When setting is made as described above, it is possible to avoid external light (arrow 025) in the range between the line 022 and the line 023 from being incident into the video display area 004.

Subsequently, external light (arrow 026) which arrives from the left side of the wearing person (−x direction) will be described. The maximum angle of external light which is not blocked by the face of the wearing person is set, and a tangent line 024 which comes into contact with the end position 050 of the housing section 008 is drawn at the set critical angle. The end position 049 of the housing section 010 is set such that the end position 049 comes into contact with the tangent line 024. When setting is made as described above, it is possible to avoid external light (arrow 026) in the range between the line 023 and the line 024 from being incident into the video display area 004.

When the housing sections 007 to 010 are set as described above, the video projection device 001 is capable of completely blocking external light (arrows 025 and 026) in the range which is indicated by the line 022 and the line 024. In addition, the transparent area 011, acquired when the above conditions are satisfied, has a form which is interposed between the line 031 and the line 022 in FIG. 2, and an opening width (a distance from the end position 049 to the end position 050) in the x direction on a side which is close to the emission section (eyepiece section) 015 is greater than an opening width (a distance from the end position 047 to the end position 045) in the x direction on a side which is far from the emission section (eyepiece section) 015.

Subsequently, the see-through function of the video projection device 001 according to the embodiment will be described.

FIG. 4 is a sectional diagram illustrating rays which reach the eye 020 from an object 060 which is in front (z direction) of the video projection device 001. FIG. 4(*a*) illustrates the cross section of the projection section 043 of the video projection device 001, and FIG. 4(*b*) illustrates the cross section of the mechanical support section 042 of the video projection device 001. The video projection device 001 is arranged at a prescribed distance from the eye 020, and some of rays from the object 060 are obstructed by the video projection device 001 and remaining rays reach the eye 020. The rays 065 are in a maximum angle range in which the rays are capable of being incident into the eye 020 from the object 060. A dotted line 061 indicates the normal direction of the eye 020.

In FIG. 4(*a*), an area 063 in which the rays of the object 060 are blocked occurs due to the projection section 043 of the video projection device 001. The projection section 043 does not include a transparent area. However, when the height (y direction) of the projection section 043 is set to be smaller than the pupil (approximately 4 mm) of the eye 020 of a human, rays 062 which (y direction) pass through up and down of the projection section 043 arrives at the eye 020. Therefore, the wearing person is capable of visually recognizing the entirety of the object 060. As described above, when the height of the projection section 043 is set to be shorter than the line 065 of the maximum angle which is made by the object 060 and the eye 020, it is possible to secure the see-through function.

In FIG. 4(*b*), the mechanical support section 042 of the video projection device 001 includes a transparent area 011. Although an area 064 in which the rays of the object 060 are blocked is generated in the mechanical support section 042, the rays 062, which pass through up and down of the mechanical support section 042, and the rays 066, which pass through the transparent area 011, arrive at the eye 020. Therefore, the blocking area 064 of FIG. 4(*b*) is smaller than the blocking area 063 of FIG. 4(*a*). As described above, when the transparent area 011 is formed in the mechanical support section 042, an advantage in which the object 060 is more easily visible is acquired.

FIG. 5 is a graph illustrating the relationship between the height of a blockage and a transmission area ratio of the rays which are delivered to the eye. When the case of FIG. 4(*a*) is assumed, the size of the eye (pupil) 020 is a general value 4 mm and a distance from the eye to the blockage (projection section 043) is 50 mm, the transmission area ratio of rays in which rays from the object 060 are delivered to the eyes without being blocked by the height Hd of the blockage (projection section 043) is calculated. In the drawing, a horizontal axis indicates a width Hd, and a vertical axis indicates a ratio of rays which are delivered to the eyes. The ratio of rays indicates rays, which are delivered without being blocked when the object 060 is set to a point and the rays which are delivered to the eyes are set to reference (100%) in a case in which the projection section 043 is not provided, as the transmission area ratio. When the transmission area ratio is high, the rays are easily visible.

As the height Hd of a blockage is high, the transmission area ratio is low. When the height Hd is higher than 3.76 mm, the transmission area ratio is zero, and thus it is difficult to be visible. Therefore, it is desirable that the height of the blockage (projection section 043) is lower than 3.76 mm as much as possible.

Based on this result, in a case of FIG. 4(b), it is desirable that the height of the transparent area 011 of the mechanical support section 042 be as high as possible. For example, it is further desirable that the height of the transparent area 011 be extended by causing the height of the mechanical support section 042 to be higher than the projection section 043.

The projection section 043 of the video projection device 001 transmits video to the eye, and thus the height thereof is restricted and there is a limit to reduce the size. In contrast, it is possible to improve visual recognition (see-through function) of the mechanical support section 042 by enlarging the transparent area 011.

In order to secure a transmission area ratio 50% that is a level in which it is possible to be visible without a problem, the sum of the heights of the up and down housing sections 016 and 017 of the transparent area 011 may be less than 1.8 mm.

As described above, the video projection device 001 according to the embodiment, the transparent area 011 is provided in the mechanical support section 042, and thus it is possible to further improve the easiness of visual recognition of the see-through function. Further, when the arrangement of the transparent area 011 (the end position of the housing section) is appropriately set, it is possible to block external light which is incident from the transparent area 011, and it is possible to secure confidentiality such that video information which is being seen by the wearing person is not seen by another person.

Second Embodiment

In a second embodiment, a video projection device, which improves the see-through function and the optical efficiency of the illuminating optical system, will be described.

FIG. 6 is a diagram illustrating the configuration of a video projection device 101 according to the second embodiment. FIG. 6(a) is a perspective view of an external appearance, FIG. 6(b) is a top view (sectional view) which is viewed from above (y direction of) the eye, and FIG. 6(c) is a side view which is viewed from the side of the eye (z direction).

The video projection device 101 includes a video generation section 191 that generates video, a projection section 193 that projects the video onto an eye, and a mechanical support section 192 that connects the video generation section 191 and the projection section 193. A user (wearing person) can watch the video from the emission section (eyepiece section) 115 of the projection section 193. The structures of the respective sections will be described.

The video generation section 191 includes a light source 102, a light integrator 103, a lens 105, a polarizing element 106, a polarizing element 195, a polarizing prism element 107, a wavelength plate 108, a reflector element 109, a micro display element 110, a protective plate 194, a temperature detection section 471, and a light quantity detection section 472.

The light source 102 is a light source which emits light in red, green, and blue wavelength bands, and an area which emits light is a light emission surface 099. The intensities of red, green, and blue light emitted from the light source 102 are integrated by the light integrator 103, thereby being uniform light. The configurations of the light source 102 and the light integrator 103 will be described later.

Light which emits from the light integrator 103 is converted into light, which is approximately parallel to the x axis, by the lens 105, is selected as vertically polarized light (polarization in the y direction which is perpendicular to the paper) by the polarizing element 106, and is incident into the polarizing prism element 107.

The polarizing prism element 107 reflects vertically polarized light to be incident into the wavelength plate 108, and causes horizontally polarized light (polarization in the z direction which is parallel to the paper) to pass therethrough. In the wavelength plate 108, vertically polarized light is converted into circularly polarized light and progresses to the reflector element 109. Light is reflected in the reflector element 109, and progresses to the wavelength plate 108. Circularly polarized light, which is incident into the wavelength plate 108 again, is converted into horizontally polarized light and progresses to the polarizing prism element 107 again. The wavelength plate 108, which is used here, has so-called a ¼ wavelength plate function. In addition, since light in the red, green, and blue wavelength bands progresses, a wide band ¼ wavelength plate, which has the ¼ wavelength plate function at any wavelength, is desirable.

The horizontally polarized light, which progresses to the polarizing prism element 107 again, penetrates through the polarizing prism element 107, and irradiates the micro display element 110 as illumination light. Meanwhile, an optical system, which irradiates the micro display element 110 with light, which is emitted from the light source 102, is the illuminating optical system.

Here, for example, a reflection-type liquid crystal device, which does not include a color filter, is used for the micro display element 110. Therefore, compared to a liquid crystal device which includes color filters, it is possible to reduce a pixel size to ⅓ thereof, and thus it is possible to realize high-resolution video. The area 111 of the micro display element 110 indicates a video display area in which video is displayed. Meanwhile, it is possible to generate color video by sequentially emitting red, green, and blue light from the light source 102 at a speed which is difficult for the eye to follow.

A video display area 111 has a function of converting incident horizontally-polarized light into vertically polarized light or horizontally polarized light for each pixel. Light is converted into vertically polarized light in a case of being valid as video, and converted into horizontally polarized light in a case of being invalid. Vertically polarized light, which becomes video in the video display area 111, and horizontally polarized light, which is invalid and does not operate as the video, are commonly incident into the polarizing prism element 107.

The polarizing prism element 107 causes vertically polarized light to be reflected and to progress to the polarizing element 195, and causes horizontally polarized light to penetrate therethrough. The polarizing prism element 107 separates light, which has video information, from invalid light. In the polarizing element 195, only vertically polarized light is selected. Although the polarizing prism element 107 has a function of separating horizontally polarized light from vertically polarized light, it is difficult to completely perform separation, and horizontally polarized light is merely reflected. Therefore, when the polarizing element 195 is used, it is possible to drastically remove horizontally polarized light which is invalid as video, and thus it is possible to realize high contrast. Meanwhile, when the polarizing elements 106 and 195 are attached and integrated to the polarizing prism element 107, it is possible to reduce the number of components to be mounted, with the result that it is possible to reduce the size of a component holding part, and thus the device is easily downsized.

Vertically polarized light, which is valid as video, progresses to the protective plate 194. The protective plate 194 is an optically transparent plate which has a function of preventing dust and water droplets from entering from the outside. The loss of light efficiency is reduced by forming an antireflection film in the red to blue bands. Video light, which passes through the protective plate 194, passes through a space in the mechanical support section 192, and is propagated into the projection section 193.

The projection section 193 includes a lens unit 112, and the lens unit 112 includes a lens section 113, a reflection section 114, and an emission section (eyepiece section) 115. The lens section 113 is a lens which has a focal distance F. When setting is made such that an optically converted distance A, which ranges from the video display area 111 of the micro display element 110 to the lens section 113, is shorter than the focal distance F, video which is projected onto the eye 020 becomes a virtual image.

The reflection section 114 is a mirror which projects video onto the eye 020 by causing the progressing direction of the video which progresses from the lens section 113 to curve. Meanwhile, a dotted line 104 indicates the progress of video light. The emission section 115 is a plane, and is the last optical surface which is emitted to the eye 020. Meanwhile, it is desirable to perform hard coating on the lens section 113, the emission section 115, and the protective plate 194 such that dust, water droplets, and hand oil are not attached and fixed thereto.

The mechanical support section 192 is a mechanism which connects the video generation section 191 and the projection section 193, and is formed to avoid a space in which the video is propagated into projection section 193 from the video generation section 191.

As illustrated in FIGS. 6(*a*) and 6(*c*), the upper surface and the lower surface of the video projection device 101 are covered by housing sections 116 and 117. The housing sections 116 and 117 have functions of connecting and supporting the video generation section 191 and the projection section 193 and blocking external light which intrudes into the inside of the device (the micro display element 110 or the like) from up and down directions of the video projection device 101.

In addition, as illustrated in FIG. 6(*b*), the side surfaces of the video projection device 101 include housing sections 120 to 126. The housing sections 120, 121, and 126 thereof are mechanisms which mainly form the video generation section 191. Further, the housing sections 123 and 124 are mechanisms which mainly form the projection section 043, and the housing sections 122 and 125 are mechanisms which mainly form the mechanical support section 192. Further, as illustrated in FIGS. 6(*a*) and 6(*c*), when viewed from the side of the eye, a transparent area 130 is formed between the housing section 123 (124) and the housing section 125, a transparent area 131 is formed between the housing section 122 and the housing section 125, and a transparent area 132 is formed between the housing section 122 and the housing section 121 (120) such that the respective areas penetrate in the z direction. As described above, when the transparent areas 130, 131, and 132 are additionally formed, the see-through function is further improved.

The temperature detection section 471 is a thermistor which detects temperature in the vicinity of the light source 102, and the light quantity detection section 472 is a photoelectric detector which detects light quantity output from the light source 102. When light in the red, green, and blue wavelength bands is realized by an LED and when light in the red wavelength band is output, a material, which is different from green and blue, is used, and thus the temperature characteristic of light quantity to be output is different. Therefore, the temperature is detected by the temperature detection section 471, and the light quantity is detected by the light quantity detection section 472, thereby controlling light quantity output from the light source 102 and a color which is composed by red, green, and blue.

Subsequently, blocking of external light and securing of confidentiality will be described.

FIG. 7 is a diagram illustrating a structure of blocking external light in the video projection device 101. FIG. 7 is a diagram which is acquired by adding lines of external light to the top view (sectional view) of FIG. 6(*b*).

It is a problem that the external light arrives from a range between a line 150 and a line 155. The other light, which arrives from the right side of the paper (+x direction) rather than the line 150, is blocked by the housing section 120, and thus it may not be a problem. In addition, light, which arrives from the bottom side of the paper (−z direction) rather than the line 155, is blocked by the face of the wearing person, and thus it may not be a problem.

In the video projection device 101 according to the embodiment, the end positions 160 to 166 of the respective housing sections 120 to 125 are set such that external light is not incident into the video display area 111. A method of setting the end positions will be described.

First, external light (arrows 156 and 157) which arrives from the front of the wearing person (+z direction) will be described. Tangent lines 140 to 143 are drawn from the eye 020 to the side of the transparent areas 130, 131, and 132 of the respective housing sections 120 to 125. Further, a contact point with the housing section 120 is set to 164, contact points with the housing section 122 are set to 166 and 163, a contact point with the housing section 125 is set to 162, a contact point with the housing section 124 is set to 161, and a contact point with the housing section 123 is set to 160.

End positions 164 and 166 are set such that a line 151 which connects the contact points 164 and 166 does not cross the video display area 111. In addition, the end position 165 of the housing section 121 is set to the side of the light source 102 (right side on the paper) rather than the tangent line 140. When setting is made as described above, it is possible to avoid external light (arrow 156) in the range between the line 150 and the line 151 from being incident into the video display area 111. In addition, the end positions 160 and 163 are set such that the line 153 which connects the contact points 160 and 163 does not cross the video display area 111. When setting is made as described above, it is possible to avoid external light (arrow 157) in the range between the line 152 and the line 153 from being incident into the video display area 111.

Subsequently, external light (arrow 158) which arrives from the left side of the wearing person (−x direction) will be described. The maximum angle of external light which is not blocked by the face of the wearing person is set, and a tangent line 155 which comes into contact with the end position 162 of the housing section 125 is drawn at the set critical angle. The end positions 161 and 162 of the housing sections 124 and 125 are set such that a tangent line 154 which connects the respective end positions 161 and 162 does not cross the video display area 111 even when reflection in the polarizing prism element 107 is taken into consideration. When setting is made as described above, it is possible to avoid external light (arrow 158) in the range between the line 154 and the line 155 from being incident into the video display area 111. Meanwhile, it is desirable to arrange an opening section 167 which is provided in the housing section 121 such that external light is not incident into the video display area 111.

When the housing sections 120 to 126 are set as described above, the video projection device 101 is capable of completely blocking external light (arrows 156, 157, and 158) in the range which is indicated by the line 150 and the line 155. In addition, the transparent areas 130 to 132, acquired when the above conditions are satisfied, have a form which is interposed between the line 143 and the line 150 of FIG. 7, and an opening width (a distance from the end position 161 to 165) in the x direction on a side which is close to the emission section (eyepiece section) 115 is greater than an opening width (a distance from the end positions 160 to 164) in the x direction on a side which is far from the emission section (eyepiece section) 115.

In the video projection device 101 according to the embodiment, the housing sections 122 and 125 are added, and thus the size of the device is reduced in a depth direction (z direction). That is, it is possible to reduce a protruded amount 171 of the housing section 120 in the z direction on a side which is far from the eye 020, compared to the protruded amount 070 of the housing section 007 in the first embodiment (FIG. 2), and thus a device downsizing effect is acquired.

In addition, setting is made such that other end positions of the housing sections 120 to 125 are not protruded to an area of the tangent lines 140 and 141 and an area of the tangent lines 142 and 143. When setting is made as described above, it is possible to secure the view of each of the range of the tangent lines 140 and 141 and the range of the tangent lines 142 and 143. In addition, when external light is not incident into the video display area 111, the video information of the video display area 111 is not seen from the outside, and thus it is possible to secure confidentiality.

Subsequently, the configuration of the light source 102 in the illuminating optical system and color shift correction will be described. FIG. 8 is a diagram illustrating the configuration of the light emission surface of the light source. Light source bodies 180, 181, and 182, which emit light in red (R), green (G), and blue (B) wavelength bands, are arranged on the light emission surface 099 of the light source 102. For example, an LED light emitting element is used for each of the light source bodies. A rectangular area which surrounds each of the light source bodies 180, 181, and 182 is a light emitting surface 185.

With regard to the position of each of the light source bodies 180, 181, and 182, a triangle (in this case, approximately a regular triangle), in which each angle is equal to or less than 90 degrees, is formed when the centers thereof are connected. The reason for this is that energy of the product of the area of the light emitting surface 185 and the square of a light emitting solid angle is stored, and thus it is desirable that alight emitting area be small. In addition, light emitting positions are different at red, green, and blue colors. Therefore, even in a case of the same light emitting area, it is desirable that the length of a side is short in order to illuminate the micro display element with uniform brightness. Therefore, the light source bodies are arranged to form a triangle in which each angle is equal to or less than 90 degrees. Therefore, setting is made such that the width Sx and the height Sy of the light emitting surface 185 are approximately equivalent to each other.

FIG. 9 is a diagram illustrating the object point and the image formation point of the optical system, and color shift generation will be described by referring to FIG. 9. Light which is emitted from light source bodies 201 and 202 becomes approximately parallel to an illuminating lens 203, and is incident into an object point 204 corresponding to the micro display element. An object point image is projected onto a projecting lens 205, passes through a lens 206 corresponding to the crystalline lens of the eye, and is formed at an image point 207 corresponding to the retina. An image point 212 indicates the image formation point of a virtual image, and an axis 209 indicates a normal line of the eye. Light quantity 213 indicates light quantity which arrives at the image point 207 from the light source body 201, and light quantity 214 indicates light quantity which arrives at the image point 207 from the light source body 202. The light source bodies 201 and 202 are arranged in a position which is symmetrical to the axis 209.

Generally, light quantities 213 and 214, which are emitted from the light source bodies 201 and 202 and arrive through the object point 204, are large when the positions of the light source bodies are close to an object point, and the light quantities 213 and 214 are small when the positions of the light source bodies are far from the object point. FIG. 9(a) illustrates a case of an object point 2041 which exists on an axis 209. Since the distances from the light source bodies 201 and 202 to the object point are equivalent, light quantities 213 and 214 are equivalent at image point 207. FIG. 9(b) illustrates a case of an object point 2042 which is on the upper side of the paper surface than the axis 209. Since the light source body 201 is closer to the object point 2042, the light quantity 213 is greater than the light quantity 214 at the image point 207. FIG. 9(c) illustrates a case of an object point 2043 which is on the lower side of the paper surface than the axis 209. Since the light source body 202 is closer to the object point 2043, the light quantity 214 is greater than the light quantity 213 at the image point 207.

That is, when the light source bodies 201 and 202 emit light of different wavelengths, the object points 2042 and 2043 which are shifted in the up and down directions of the paper surface from the axis 209 are seen as different colors in the eye. Such a phenomenon is called "color shift".

In order to correct the color shift, on the embodiment, the light integrator 103 is arranged on the emission side of the light source 102.

FIG. 10 is a diagram illustrating the configuration of the light integrator 103. The light integrator 103 is a square columnar resin body which has a length L, a height H, and a width W, and includes six surfaces 221 to 226. From among this, the surface 221 is a surface which has a light diffusion function, and the other surfaces 222 to 226 are flat surfaces in which diffusion is not performed. Symbol 228 indicates a gate which is used when resin is formed.

The surface 221 is the light emission surface of the light integrator 103, and is arranged on the side of the lens 105. The surface 226 is the incident surface of the light integrator 103, and is arranged on the side of the light source 102. The gate 228 is arranged on the surface 222. When the gate 228 is formed to be as small as possible, influence to an integrating function which will be described later is reduced, and thus the loss of light is minimized.

Light which is emitted from the light source 102 enters the light integrator 103 from the incident surface 226, is repeatedly internally reflected in the surfaces 222 to 225, and arrives at the light emission surface 221. Rays which reach the light emission surface 221 are emitted to the lens 105 after the angles thereof are converted through the diffusion function.

Here, the number of reflection (integration number) of light, which is emitted from the light integrator 103, within the light integrator is estimated. When it is assumed that a diffusion angle (half angle at half maximum) which indicates the diffusion function of the light emission surface 221 is set to θd, an angle of light which arrives at the eye when emission is performed from the light emission surface 221 is set to θ, and the refractive index of the light integrator 103 is set to N, it is possible to express the integration number Ip within the light integrator 103 using Equation (2).

$$Ip = (\pi \cdot L2/(W \cdot H)) \cdot \tan 2(\theta/N + \theta d) \quad (2)$$

That is, the integration number Ip is calculated by dividing an area, acquired when light progresses by a distance L at an angle (θ/N+θd) which is formed using an angle θ of light in a case of emission and a half angle at half maximum θd in a case of diffusion, by the sectional area (W·H) of the light integrator 221. Meanwhile, with regard to the angle θ of light in a case of emission, an angle is converted due to the refraction performed when light is incident into the inside of the light integrator 103, and thus a refractive index N is assigned to a denominator.

As described above, energy of the product of a light emitting area and the square of a light emitting solid angle is stored. For example, the half angle at half maximum θd of light which arrives at the eye from the video projection device 101 is set to 3 degrees, and the size of the micro display element 110 is set to 3×3 mm. In an LED as the light source, if a light emitting surface size is equal to or less than 1 mm, light is easily acquired. Therefore, when the light emission surface is set to 1×1 mm, the angle θ of light which is emitted from the light integrator 103 is approximately 9 degrees. With regard to the integration number Ip, integration is generally performed in 20 or more times, and thus it is considered that light is sufficiently equalized. That is, with regard to light of each wavelength from the light source, the optical path length thereof is equalized within the light integrator 103, and thus the color shift problem which is described in FIG. 9 is solved.

FIG. 11 is a diagram illustrating the relationship between the length L of the light integrator 103 and the diffusion angle (half angle at half maximum) θd in order to realize that the integration number Ip=20.

It is understood that the necessary length L of the light integrator 103 is short as the diffusion angle θd of the light emission surface 221 is large. When the diffusion function is not given to the light emission surface 221 (θd=0), the length L, which is equal to or longer than 25 mm, is necessary. The length, which is longer than 25 mm, is a size which is not acceptable in an external form as the video projection device of the head mounted display. When the diffusion function is given to the light emission surface 221, it is possible to shorten the necessary length L. When setting is made such that θd=60 degrees corresponding to perfect diffusion, the length L, which is equal to or longer than 3.1 mm, is necessary. This indicates a case in which, even when only a perfect diffusion board is arranged without arranging the light integrator 103, it is difficult to improve the color shift because the integrating function is not provided. When both the integrating function and the diffusion function are given using the internal reflection, it is possible to implement an illuminating optical system which emits equalized light in a small space at a prescribed angle.

It is difficult for light at an angle which is greater than a critical angle to be internally reflected in the light integrator 103. Therefore, when θd is greater than 40 degrees, the necessary length of the light integrator 103 is saturated to approximately 3.1 mm. Therefore, a preferable condition of the light integrator 103 is that the length L=3.1 mm and the diffusion angle θd=40.

Meanwhile, when the light integrator 103 is manufactured through resin molding, the gate 228 is necessary. When a polishing treatment is not performed on the gate 228 after molding, internal reflection is not performed, and thus effects according to the above calculation are not acquired. Therefore, the size of the unprocessed gate 228 is set to, for example, approximately 0.9 mm, the length of the light integrator 103 is at least approximately 4.0 mm when adding the length of the gate. It is apparent that it is possible to manufacture the light integrator 103 through only polishing instead of molding. In this case, the gate is not necessary, and thus a length of 3.1 mm may be provided as above.

The optical efficiency of the illumination light is determined by the square of a usable angle of light which is emitted from the light source. In the video projection device 001 according to the first embodiment, there is not a lens that concentrates light from the light source 002, and thus only light to a half angle of 3 degrees can be used. In contrast, in the video projection device 101 according to the second embodiment, light to a half angle of 9 degrees can be used, and thus it is possible to implement an optical system which has 9 times higher efficiency than the first embodiment.

As described above, the video projection device 101 according to the second embodiment is provided with the plurality of transparent areas 130 to 132 in the mechanical support section 192, and thus it is possible to further improve the easiness of visual recognition of the see-through function. In addition, when setting is made such that the transparent areas 130 to 132 are appropriately arranged, it is possible to block external light which is incident from the transparent area and it is possible to secure confidentiality such that video information which is being seen by the wearing person is not seen by another person.

Further, according to the second embodiment, the light integrator 103 which includes both the integrating function and the diffusion function according to the internal reflection, is provided, it is possible to realize a small-sized and high performance light integrator, and thus it is possible to improve the optical efficiency of the illuminating optical system.

Third Embodiment

In a third embodiment, modification examples of the light integrator 103 and the light source 102 of the video projection device 101 according to the second embodiment will be described.

FIG. 12 is a diagram illustrating a first modification example of a light integrator. A light integrator 300 includes an incident surface 301 and a light emission surface 302. The light emission surface 302 has a diffusion function, and the incident surface 301 is provided with angle conversion surfaces 303 to 305 which cause the angles of incident rays to curve. Incident light 313 to 315 (corresponding to emitted light from the respective light source bodies 180, 181, and 182 of FIG. 8) from the light source 102 respectively progress toward the center of the light emission surface 302 due to the angle conversion surfaces 303 to 305. Therefore, angular errors in accordance with the shift of the positions of the light source bodies are complemented, and thus light is more easily integrated (it is possible to reduce the integration number). Accordingly, it is possible to make the length L of the light integrator 300 shorter than 4 mm even when the gate 306 is taken into consideration.

FIG. 13 is a diagram illustrating a second modification example of the light integrator. A light integrator 350 includes an incident surface 351 and a light emission surface 352. The light emission surface 352 has a diffusion function, and the incident surface 351 is arranged with concave lenses 353 to 355 which cause the angles of incident rays to curve. With regard to the respective centers of incident light 313 to 315 from the light source 102, the centers of the concave lenses 353 to 355 are shifted. Therefore, it is possible to convert the angles of incident light using the eccentric of the lenses, and to cause light to progress to the center of the light emission surface 352. Therefore, angular errors in accordance with the shift of the positions of the light source bodies are complemented. In addition, when a function of radiating angles of light using concave lenses is used, an integral effect is acquired at a shorter distance than that of the light integrator 300 of FIG. 12, and thus it is possible to further shorten the length L of the light integrator 350. It is possible to recognize the effect of the above-described complicated configuration through simulation.

FIG. 14 is a diagram illustrating a first modification example of the light source. In the light emission surface 500 of the light source 102, the position of the light source body 180 on the light emission surface 099 of FIG. 8 is shifted, and thus the respective light source bodies 180, 181, and 182 are arranged to form an L shape. It is the same that, when the centers of the respective light source bodies are connected, a right-angle triangle is formed, thereby being a triangle in which each angle is equal to or less than 90 degrees. The sizes of the light emission surface 500 and the light emitting surface 185 of the light emission surface 099 are not changed together with a width Sx and a height Sy. That is, energy expressed by the product of a light emitting area and the square of a light emitting solid angle is stored, and thus the arrangement of the light source bodies of the light emission surface 500 causes light efficiency to be acquired at the same level as that of the light emission surface 099.

FIG. 15 is a diagram illustrating a second modification example of the light source. The light emission surface 550 of the light source 102 is acquired by adding a light source body 183 to the light emission surface 500 of FIG. 14. Although the respective light source bodies 180, 181, 182, and 183 are arranged to form a quadrangle, the size of the light emitting surface 185 is not changed together a width Sx and a height Sy. In this case, it is possible to cause illumination light to be brighter while maintaining light efficiency at the same level. Meanwhile, when, for example, light in the white wavelength band is emitted as the light source body 183, it is possible to cause illumination light to be the brightest. In addition, when, for example, light in the yellow wavelength band is emitted as the light source body 183, it is possible to enlarge a color reproduction range.

Fourth Embodiment

In a fourth embodiment, a head mounted display 450 on which the video projection device 101 is mounted will be described.

FIG. 16 is a diagram illustrating a state in which a head mounted display 450 is mounted. A state in which the head mounted display 450 is mounted on a user is viewed from overhead. In addition, FIG. 17 is a block diagram illustrating the functional configuration of the head mounted display 450.

In addition to the video projection device 101, the head mounted display 450 includes an imaging section 449 that acquires external information 479, a power supply section 435, a communication section 433 that communicates with an external server 478, an operation input section 475, such as a voice sensing element 439 and a touch sensing element 458, a controller 440, a sensing section 490, such as an acceleration sensing element 445 or a position sensing element 446 that acquires the external information 479, a data table 476, and the like.

The power supply section 435 is a chargeable power supply such as a battery. The power supply section 435 supplies desired power to the device through the controller 440. At this time, the controller 440 has a selection function of supplying power to a desired device according to a situation. The communication section 433 is a communication device that is capable of accessing information on the Internet or the external server 478, such as an electronic device, that is possessed by the wearing person (user) 430. The touch sensing element 458 is a sensing element such as a touch panel, and the voice sensing element 439 is an element, such as a microphone, that detects the voice of the wearing person 430.

The operation input section 475 performs input such that the wearing person 430 operates the head mounted display 450 through voice recognition using the voice sensing element 439 or the positional information of a finger using the touch sensing element 458. The acceleration sensing element 445 detects acceleration using the principle of a piezoelectric element or electrostatic capacity. The position sensing element 446 is an element, such as a GPS, that detects a position. The controller 440 is a main chip that controls each of the devices and each of the sections.

In the head mounted display 450, it is possible to see video 459, which is projected from the video projection device 101, in the visual field 437 of the wearing person 430. An angle adjustment mechanism 432, which adjusts the projection direction of the video projection device 101, is provided such that the video 459 is seen in the visual field 437. Therefore, the wearing person 430 is capable of adjusting the position of the video 459 in a favorite position. Meanwhile, it is possible to easily realize the angle adjustment mechanism 432 using, for example, a hinge.

FIG. 16 illustrates a state in which the video projection device 101 is mounted on the side of the right eye 441. However, it is possible to mount the video projection device 101 on the side of the left eye 442. Therefore, the controller 440 has a function of normally displaying correct video to the wearing person 430 by vertically and laterally inversing the video on the basis of information which is acquired by the acceleration sensing element 445. The head mounted display 450 is used by being fixed to the head, such as ears 443 and 444 or fixing portions 451 to 453, and thus both hands are free.

Subsequently, some usage examples of the head mounted display 450 will be described.

(1) A case, in which steps exist in a front passage when the wearing person 430 is walking, is assumed. The controller 440 is capable of processing video information (range indicated by 438) which is acquired by the imaging section 449, recognizing that steps exist in the passage, displaying a message "watch steps" using the video projection device 101 on the video 459, and notifying the wearing person 430. At this time, the controller 440 causes the light source 102 to emit light, and transmits a video signal of a prescribed message to the micro display element 110.

(2) A case, in which, for example, information that a train which is used for commuting stops due to an accident is generated as social network information which is the external information 479 related to the wearing person 430, is assumed. The external information is transmitted to the controller 440 from the communication section 433, and thus it is possible to notify the wearing person 430 of a message "commuter train is delayed due to accident" by the video projection device 101. At this time, the controller 440 has a function of usually monitoring information on the Internet at the request of the wearing person 430.

(3) When the wearing person 430 wants to take a picture using the imaging section 449, the controller 440 recognizes voice using the voice sensing element 439 or detects the request of the wearing person 430, such as the positional information of a finger using the touch sensing element 458, from the operation input section 475, and drives the imaging section 449. Therefore, it is possible to take a picture. In this case, it is possible to transmit information of the taken picture on a cloud network, which is possessed by the wearing person 430, on the Internet using the communication section 433. It is apparent that it is possible to project the video which is taken for the video 459. In this case, it is desirable that the controller 440 usually preferentially processes a signal input from the operation input section 475.

(4) When the wearing person 430 is dozing off in the train, the controller 440 detects shaking of the head from the acceleration sensing element 445, and detects that the wearing person 430 is present in the train from the imaging section 449. Therefore, it is possible to save power by tuning off power of the video projection device 101.

(5) When the wearing person 430 is present in an unusual region, the controller 440 detects that the wearing person 430 is present in an unusual position based on the positional information of the sensing section 490. Further, the controller 440 is capable of determining travel or a business trip based on the information of the imaging section 449, acquiring a guide to travel, nearby food information, or the like from the communication section 433, and notifying the wearing person 430.

As described above, the controller 440 has functions of determining the situation of the user, and supplying information acquired from the outside to the user as video information from the video projection device 101.

In addition, the controller 440 has functions of monitoring temperature information from the temperature detection section 471, which is included in the video projection device 101, and light quantity information from the light quantity detection section 472, and optimally controlling the output of the light source 102.

FIG. 18 is a flowchart illustrating control performed on the output of the light source 102. Here, for color video display, a Field Sequential Color (FSC) method, in which the light source 102 emits light in red, green, and blue wavelength bands in synchronization with the micro display element 110, is assumed. Hereinafter, in order to adjust red, green, and blue light quantities, three control methods (a) to (c) will be described.

The (a) method is used when the red, green, and blue light quantities are measured, respectively. In initial setting performed in S600, the initial values I0(R), I0(G), and I0(B) of the red, green, and blue light quantities which are emitted from the light source 102 are set such that prescribed color illumination light is made, and the initial values I0(R), I0(G), and I0(B) are stored in the data table 476.

In S601, the respective color light quantities are sequentially measured in synchronization with timings, at which red, green, and blue are sequentially emitted, through the FSC method using a photoelectric detector, which is independent from the wavelengths, as the light quantity detection section 472. The measured light quantities are set to Ia(R), Ia(G), and Ia(B). When the light quantities change due to the change in temperature, difference quantities $\Delta$I(R), $\Delta$I(G), and $\Delta$I(B) from the initial values I0(R), I0(G), and I0(B) are acquired in S602. In S603, outputs of the respective colors from the light source 103 are respectively adjusted according to the difference quantities such that the outputs are equal to the initial values of the light quantities.

Meanwhile, when the light quantity detection section 472 is a color photoelectric detector which is capable of detecting the light quantities for the respective wavelength bands, the precision of the control is improved by simultaneously measuring the respective light quantities Ia(R), Ia(G), and Ia(B).

The (b) method is used when only the red light quantity is measured. In this method, in the light source 102, the red light quantity has particularly large temperature dependency due to the influence of a light emitting material, and thus the red light quantity is measured as a representative. In initial setting performed in S610, the initial value I0(R) of the red light quantity and the temperature dependency data I(R)-T, I(G)-T, and I(B)-T of the red, green, and blue light quantities are stored in the data table 476.

In S611, only the red light quantity Ia(R) is measured by the light quantity detection section 472. In S612, the difference quantity $\Delta$I(R) from the initial value I0(R) is acquired. In S613, the output of red light is adjusted according to the difference quantity such that the output of red light is equal to the initial value of red.

In S614, the change $\Delta$T in temperature is acquired based on the difference quantity $\Delta$I(R), which is acquired in S612, with reference to red temperature dependency data I(R)-T. In S615, the outputs of green light and blue light are adjusted based on the change $\Delta$T in temperature, which is acquired in S614, with reference to green temperature dependency data I(G)-T and blue temperature dependency data I(B)-T.

In the method, only the red light quantity may be measured, and thus the configuration is simple. Meanwhile, the color of measured light may be another color light instead of red light if there is the temperature dependency.

The (c) method is used when only the change in temperature is measured instead of the light quantities. In initial setting performed in S620, the initial value T0 of temperature in the vicinity of light source 102 and the temperature dependency data I(R)-T, I(G)-T, and I(B)-T of the red, green, and blue light quantities are stored in the data table 476.

In S621, temperature Ta in the vicinity of the light source 102 is measured by the temperature detection section 471. In S622, the change $\Delta$T in temperature from initial value T0 is acquired. In S623, the outputs of the respective colors from the light source 103 are respectively adjusted based on the change $\Delta$T in temperature acquired in S622 with reference to the temperature dependency data I(R)-T, I(G)-T, and I(B)-T of the respective colors.

In the method, only temperature measurement may be performed, and thus the configuration is simple compared to light quantity measurement.

As described above, there are advantages in that the outputs of the light source 102 of the video projection device 101 are optimally controlled and that the fluctuation in colors of video to be displayed is suppressed by the controller 440.

According to the head mounted display 450 of the fourth embodiment, it is possible to supply various pieces of video information to some visual fields of the wearing person by the video projection device 101. At this time, visual recognition is improved by the see-through function and it is possible to secure confidentiality of the video information which is being seen by the wearing person, and thus the head mounted display 450 is safe and is excellent in usability.

REFERENCE SIGNS LIST 001,101: video projection device,
002,102: light source,
003,110: micro display element,
005,112: lens unit,
007-010,120-126: housing section,
011,130,131,132: transparent area,
015,115: emission section (eyepiece section),
040,194: protective plate,
041,191: video generation section,
042,192: mechanical support section,
043,193: projection section,
103,300,350: light integrator,
105: lens,
107: polarizing prism element,
180,181,182,183: light source body,
221,302,352: light emission surface (diffusion function),
303,304,305: angle conversion surface,
353,354,355: concave lens,
430: wearing person (user),
440: controller,
450: head mounted display,
471: temperature detection section,
472: light quantity detection section,
476: data table

The invention claimed is:

1. A video projection device which projects video onto an eye of a user, comprising:
 a video generation section that includes a micro display element which generates the video, and an illuminating optical system which illuminates the micro display element;
 a projection section that projects the video, which is generated by the video generation section, onto the eye of the user through an eyepiece section included in the projection section; and
 a mechanical support section including an upper housing section and a lower housing section that connect the video generation section to the projection section,
 wherein a first transparent area is defined by the mechanical support section, the first transparent area extends in a first direction between the video generation section and the projection section, and the first transparent area extends in a second direction between a first opening in the mechanical support section between the upper housing section and the lower housing section and a second opening in the mechanical support section between the upper housing section and the lower housing section,
 wherein the video from the video generation section propagates through the first transparent area in the mechanical support section to the projection section,
 wherein the first direction corresponds to a direction in which the video is emitted from the video generation section and propagates to the projection section,
 wherein the second direction corresponds to a direction in which the video from the projection section is projected,
 wherein the first opening in the mechanical support section is on a side of the mechanical support section closer to the eyepiece section in the second direction and the second opening in the mechanical support section is on a side of the mechanical support section farther from the eyepiece section in the second direction,
 wherein a width in the first direction of the first opening in the mechanical support section is greater than a width in the first direction of the second opening in the mechanical support section,
 wherein the mechanical support section is arranged to pass a first range of external light through the first opening, the first transparent area and the second opening in the mechanical support section and to block a second range of external light from passing through the second opening and being incident on the micro display element,
 wherein a second transparent area is defined by the mechanical support section on a side of the first transparent area closer to the projection section, the second transparent area extends in the first direction between the video generation section and the projection section, and the second transparent area extends in the second direction between a third opening in the mechanical support section between the upper housing section and the lower housing section and a fourth opening in the mechanical support section between the upper housing section and the lower housing section,
 wherein the video from the video generation section propagates through the first transparent area and the second transparent area in the mechanical support section to the projection section,
 wherein the third opening in the mechanical support section is on the side of the mechanical support section closer to the eyepiece section in the second direction and the fourth opening in the mechanical support section is on the side of the mechanical support section farther from the eyepiece section in the second direction, and
 wherein a width in the first direction of the third opening in the mechanical support section is less than a width in the first direction of the fourth opening in the mechanical support section.

2. The video projection device according to claim 1,
 wherein the illuminating optical system of the video generation section includes:
 a light source that emits light in a plurality of wavelength bands;
 a square columnar light integrator that causes light, which is emitted from the light source, to be internally reflected, integrates light intensities, and makes uniform light; and
 a lens section that converts light, which is emitted from the light integrator, into light which is approximately parallel, and
 wherein a light emission surface on a side of the lens section of the light integrator has a diffusion function of diffusing light.

3. The video projection device according to claim 2,
 wherein the light source includes three light source bodies that emit light in red, green, and blue wavelength bands, and wherein a central point of each of the light source bodies is arranged to be a vertex position of a triangle having an angle which is equal to or less than 90 degrees.

4. The video projection device according to claim 2, wherein a relationship $(\pi \times L2/(W \times H)) \times \tan 2(\theta/N+\theta d) \geq Ip$ is satisfied, where an angle of light which is emitted from the light integrator is $\theta$, a half angle at half maximum of the diffusion function of the light integrator is $\theta d$, a length of the light integrator is L, a width is W, a height is H, a refractive index is N, and a predetermined integration number in the light integrator is Ip.

5. The video projection device according to claim 4, wherein a length L of the light integrator is in a range of 3.1 mm to 4 mm, and the half angle at half maximum $\theta d$ of the diffusion function is 40 degrees.

6. The video projection device according to claim 3, wherein an angle conversion surface is provided on an incident surface of the light integrator such that light in the red, green, and blue wavelength bands which is incident from the light source progresses toward a center of the light emission surface of each of the light integrators.

7. The video projection device according to claim 3, wherein a concave lens is provided on an incident surface of the light integrator such that light in the red, green, and blue wavelength bands which is incident from the light source progresses toward a center of the light emission surface of each of the light integrators.

8. The video projection device according to claim 2, wherein the light source includes four light source bodies that emit light in white, red, green, and blue wavelength bands, and
wherein a central point of each of the light source bodies is arranged at a respective corner position of a quadrangle.

9. The video projection device according to claim 2, wherein the light source includes four light source bodies that emit light in yellow, red, green, and blue wavelength bands, and
wherein a central point of each of the light source bodies is arranged at a respective corner position of a quadrangle.

10. The video projection device according to claim 1, wherein the mechanical support section includes a first side housing section between the first opening and the third opening which connects the upper housing section to the lower housing section, and a second side housing section between the second opening and the fourth opening which connects the upper housing section to the lower housing section.

11. The video projection device according to claim 10, wherein the mechanical support section is arranged to pass a third range of external light through the third opening, the second transparent area and the fourth opening in the mechanical support section,
wherein the mechanical support section is arranged to block a fourth range of external light from passing through the fourth opening and being incident on the micro display element, and
wherein the mechanical support section is arranged to block a fifth range of external light from passing through the third opening and being incident on the micro display element.

12. The video projection device according to claim 1, wherein a height of the projection section is less than a height of the mechanical support section.

13. The video projection device according to claim 1, wherein the mechanical support section includes a transparent film or a transparent plate disposed in at least the first transparent area.

14. A head mounted display on which a video projection device that projects video onto an eye of a user is mounted, wherein the video projection device includes:
a video generation section that includes a micro display element which generates the video, and an illuminating optical system which includes a light source that emits light in a plurality of wavelength bands and illuminates the micro display element;
a projection section that projects the video, which is generated by the video generation section, onto the eye of the user through an eyepiece section included in the projection section; and
a mechanical support section including an upper housing section and a lower housing section that connect the video generation section to the projection section; and
a controller that controls the video which is projected from the video projection device,
wherein a first transparent area is defined by the mechanical support section, the first transparent area extends in a first direction between the video generation section and the projection section, and the first transparent area extends in a second direction between a first opening in the mechanical support section between the upper housing section and the lower housing section and a second opening in the mechanical support section between the upper housing section and the lower housing section,
wherein the video from the video generation section propagates through the first transparent area in the mechanical support section to the projection section,
wherein the first direction corresponds a direction in which the video is emitted from the video generation section and propagates to the projection section,
wherein the second direction corresponds to a direction in which the video from the projection section is projected,
wherein the first opening in the mechanical support section is on a side of the mechanical support section closer to the eyepiece section in the second direction and the second opening in the mechanical support section is on a side of the mechanical support section farther from the eyepiece section in the second direction,
wherein a width in the first direction of the first opening in the mechanical support section is greater than a width in the first direction of the second opening in the mechanical support section,
wherein the mechanical support section is arranged to pass a first range of external light through the first opening, the first transparent area and the second opening in the mechanical support section,
wherein the mechanical support section is arranged to block a second range of external light from passing through the second opening and being incident on the micro display element,
wherein a second transparent area is defined by the mechanical support section, the second transparent area extends in the first direction between the video generation section and the projection section on a side of the first transparent area closer to the projection section, and the second transparent area extends in the second direction between a third opening in the mechanical support section between the upper housing section and the lower housing section and a fourth opening in the mechanical support section between the upper housing section and the lower housing section, wherein the third opening in the mechanical support section is on the side of the mechanical support section closer to the eyepiece section in the second direction and the fourth opening in the mechanical support section is on the side of the mechanical support section farther from the eyepiece section in the second direction, wherein a width in the first direction of the third opening in the mechanical support section is less than a width in the first direction of the fourth opening in the mechanical support section, wherein the video from the video generation section propagates through the first transparent area in the mechanical support section to the eyepiece section, wherein the mechanical support section is arranged to pass a third range of external light through the third opening, the second transparent area and the fourth opening in the mechanical support section, wherein the mechanical support section is arranged to block a fourth range of external light from passing through the fourth opening and being incident on the micro display element, and wherein the mechanical support section is arranged to block a fifth range of external light from passing through the third opening and being incident on the micro display element.

15. The head mounted display according to claim 14, further comprising:
 a light quantity detection section that detects light quantity of each of the wavelength bands of the light source; and
 a data table that stores an initial setting value of the light quantity of each of the wavelength bands of the light source,
wherein the controller compares the light quantity of each of the wavelength bands, which is detected by the light quantity detection section, with the initial setting value of the light quantity of each of the wavelength bands, which is stored in the data table, and controls an output of the light source according to difference quantity thereof.

16. The head mounted display according to claim 14,
wherein the illuminating optical system includes the light source that emits light in a red wavelength band,
wherein the head mounted display further includes:
 a red light quantity detection section that detects light quantity of the red wavelength band of the light source; and
 a data table that stores an initial setting value of the light quantity of the red wavelength band of the light source and temperature dependency data of the emitted light quantity of each wavelength band, and
wherein the controller compares the light quantity of the red wavelength band, which is detected by the red light quantity detection section, with the initial setting value of the light quantity of the red wavelength band, which is stored in the data table, controls output of the light source of the red wavelength band based on a difference quantity, acquires change in the temperature of the light source with reference to the temperature dependency data of the emitted light quantity of the red wavelength band which is stored in the data table, refers to the temperature dependency data of the emitted light quantity of each of the wavelength bands, which are stored in the data table, other than the red wavelength band, and controls the output of the light source of each of the wavelength bands other than the red wavelength band according to the change in the temperature.

17. The head mounted display according to claim 14, further comprising:
 a temperature detection section that detects temperature in a vicinity of the light source; and
 a data table that stores an initial value of the temperature in the vicinity of the light source, and the temperature dependency data of the emitted light quantity of each of the wavelength bands,
wherein the controller acquires a change in the temperature by comparing the temperature which is detected by the temperature detection section with the initial setting value of the temperature stored in the data table, refers to the temperature dependency data of the emitted light quantity of each of the wavelength bands, which is stored in the data table, and controls output of the light source according to the change in the temperature.

* * * * *